(12) United States Patent
Yasumi

(10) Patent No.: US 12,088,889 B2
(45) Date of Patent: Sep. 10, 2024

(54) INFORMATION PROCESSING TERMINAL, INFORMATION PROCESSING METHOD, AND PROGRAM

(71) Applicant: Saturn Licensing LLC, New York, NY (US)

(72) Inventor: Manabu Yasumi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/753,158

(22) PCT Filed: Sep. 28, 2018

(86) PCT No.: PCT/JP2018/036188
§ 371 (c)(1),
(2) Date: Apr. 2, 2020

(87) PCT Pub. No.: WO2019/073813
PCT Pub. Date: Apr. 18, 2019

(65) Prior Publication Data
US 2021/0084380 A1   Mar. 18, 2021

(30) Foreign Application Priority Data

Oct. 12, 2017   (JP) .................................. 2017-198477

(51) Int. Cl.
*H04N 21/482* (2011.01)
*H04N 21/488* (2011.01)

(52) U.S. Cl.
CPC ..... *H04N 21/4828* (2013.01); *H04N 21/4821* (2013.01); *H04N 21/4882* (2013.01)

(58) Field of Classification Search
CPC .................. H04N 21/482; H04N 21/47; H04N 21/42222; H04N 21/42204; H04N 21/41407; H04N 21/4312; H04N 21/4355
See application file for complete search history.

(56) References Cited

U.S. PATENT DOCUMENTS 8,949,902 B1 * 2/2015 Fabian-Isaacs .... H04N 21/4821
725/52
10,845,954 B2 * 11/2020 Shintani ........... H04N 21/42204
(Continued)

FOREIGN PATENT DOCUMENTS

JP   2007074009 A   3/2007
JP   2009104436 A   5/2009
(Continued)

OTHER PUBLICATIONS

International Search Report for PCT/JP2018/036188 mailed Dec. 11, 2018, 5 pages.

*Primary Examiner* — Jason Salce
(74) *Attorney, Agent, or Firm* — Richard Laperuta

(57) ABSTRACT

The present technology relates to an information processing terminal, an information processing method, and a program by which screen display that is easy to understand can be carried out.

An information processing terminal according to one embodiment of the present technology displays, in a case where an assist function for voice reading of a description displayed on a screen is on, a screen related to a predetermined description such that the displayed screen has a structure different from that in a case where the assist function is off. The present technology is applicable to apparatuses including a television receiver, a personal computer, and a mobile terminal or the like, which are used for viewing programs.

14 Claims, 21 Drawing Sheets

(56) References Cited

U.S. PATENT DOCUMENTS

| | | | |
|---|---|---|---|
| 2002/0166122 A1* | 11/2002 | Kikinis | H04N 21/4316 725/56 |
| 2004/0194137 A1* | 9/2004 | Shreesha | H04N 5/44543 725/41 |
| 2009/0113306 A1 | 4/2009 | Fujishita et al. | |
| 2009/0141174 A1* | 6/2009 | Hardacker | H04N 21/482 348/569 |
| 2011/0302599 A1* | 12/2011 | Eyer | H04N 21/482 725/28 |
| 2012/0297420 A1* | 11/2012 | Mountain | H04N 5/44543 725/40 |
| 2012/0323578 A1* | 12/2012 | Kubota | G10L 13/00 704/260 |
| 2015/0248887 A1* | 9/2015 | Wlodkowski | G06F 3/04892 704/246 |
| 2016/0179463 A1* | 6/2016 | Higa | H04N 21/42222 725/52 |
| 2017/0245000 A1* | 8/2017 | Deshpande | H04N 21/4345 |
| 2018/0024845 A1* | 1/2018 | Card, II | G06F 3/0304 715/719 |

FOREIGN PATENT DOCUMENTS

| | | | |
|---|---|---|---|
| JP | 2014082722 A | 5/2014 | |
| JP | 2016092545 A | 5/2016 | |

* cited by examiner

FIG.2

| | 19:00 | 19:30 | 20:00 |
|---|---|---|---|
| bh-Art8 001 | Weekly Drama "fate Episode1" ♡ 423 | | |
| Z Bridge 002 | News of night ♡ 103 | Guitar lesson ♡ 356 | Country ♡ 148 |
| Watch oom 003 | It is for laugh. ♡ 125 | | |
| UUchannel 004 | The Future ♡ 457 | | Super I ♡ 310 |
| Abannel 9 005 | Special Anime "Stone Village" Episode35 ♡ 148 | | Special "Stone ♡ 245 |
| Hit ch 006 | Love Animal ♡ 783 | | |
| Star-C 007 | World Tennis Cup Quarterfinal at Tokyo ♡ 788 | | World T Quarter ♡ 840 |
| Suu v.. 008 | Live talk of Sports Star network ♡ 147 | | The tal Product ♡ 483 |

◄ Now  ◄ 05/20(Sun) ►

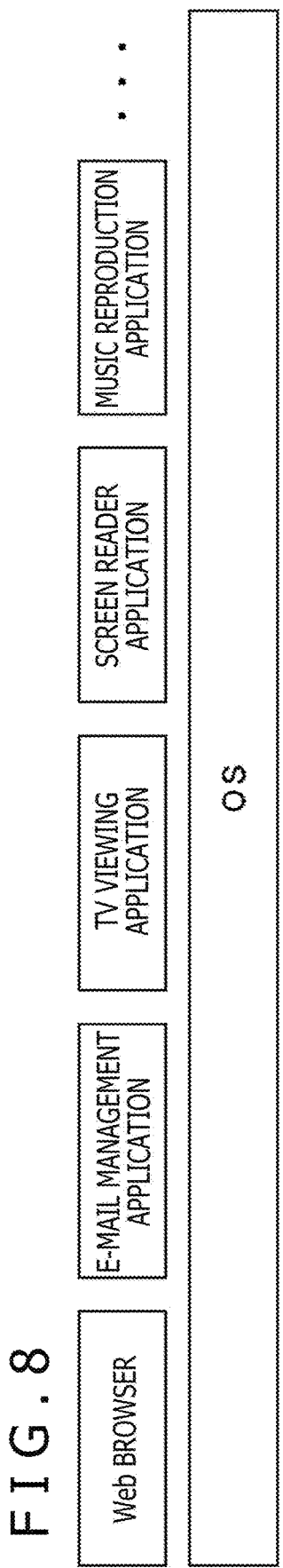
F I G . 8

FIG.11

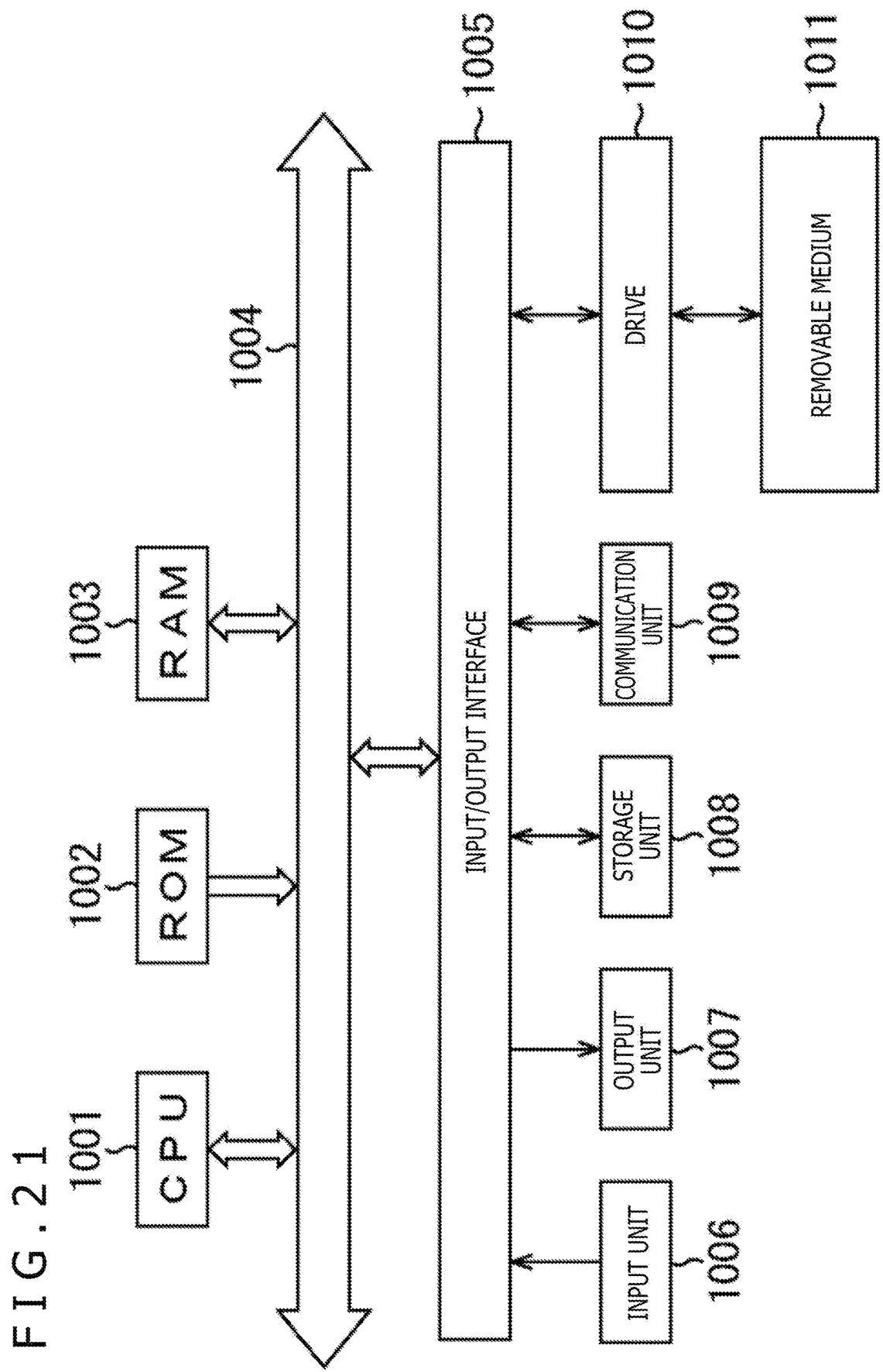

INFORMATION PROCESSING TERMINAL, INFORMATION PROCESSING METHOD, AND PROGRAM

CROSS-REFERENCE TO RELATED APPLICATIONS

This application is a national phase entry under 35 U.S.C. § 371 of International Application No. PCT/JP2018/036188 filed Sep. 28, 2018, which claims the priority from Japanese Patent Application No. 2017-198477 filed in the Japanese Patent Office on Oct. 12, 2017, the entire contents of which are hereby incorporated by reference.

TECHNICAL FIELD

The present technology relates to an information processing terminal, an information processing method, and a program, and specifically relates to an information processing terminal, an information processing method, and a program by which screen display that is easy to understand can be carried out.

BACKGROUND ART

The number of users who view programs by using mobile terminals such as what are called smartphones and tablet terminals is increasing. Since the communication environment is being improved, it becomes possible to view a program that is provided over a network by directly receiving the program at a mobile terminal, instead of viewing a recorded program by transferring the recorded program to a mobile terminal.

CITATION LIST

Patent Literature

[PTL 1]
Japanese Patent Laid-Open No. 2016-92545

SUMMARY

Technical Problems

There are so many channels of distribution services that are provided by CATV companies, etc., that it is difficult to find a particular program on a screen of a mobile terminal.

For example, it is difficult for visually impaired users to find a particular program in a program guide in a grid format in which a channel axis is vertically set while a time axis is horizontally set.

Moreover, in a case where a contract for each channel is necessary to view programs, it is difficult to recognize which channel has been contracted and is viewable from a program guide in which both viewable channels and unviewable channels are included.

The present technology has been made in view of these circumstances, and is provided to carry out screen display that is easy to understand.

Solution to Problems

An information processing terminal according to a first aspect of the present technology includes
a display control unit that, in a case where an assist function for voice reading of a description displayed on a screen is on, displays a screen related to a predetermined description such that the displayed screen has a structure different from that in a case where the assist function is off.

An information processing terminal according to a second aspect of the present technology includes
an acquisition unit that acquires information indicating a viewable channel among a plurality of channels by which programs are provided, and
a display control unit that displays, on a screen on which information regarding the programs is displayed, an indicator indicating that a channel is viewable.

In the first aspect of the present technology, in a case where the assist function for voice reading of a description displayed on a screen is on, a screen related to a predetermined description is displayed such that the displayed screen has a structure different from that in a case where the assist function is off.

In the second aspect of the present technology, information indicating a viewable channel among a plurality of channels by which programs are provided is acquired, and an indicator indicating that a channel is viewable is displayed on a screen on which information regarding the programs is displayed.

Advantageous Effects of Invention

According to the present technology, screen display that is easy to understand can be implemented.

It is to be noted that the effects described above are not limited, and any one of the effects described in this disclosure may be provided.

BRIEF DESCRIPTION OF DRAWINGS

FIG. 2 is a diagram depicting an example of displaying a program guide.

FIG. 4 is a diagram depicting an example of transition of a program guide in a case where a screen reader function is on.

FIG. 5 is a diagram depicting an example of transition of a program guide in a case where a screen reader function is on.

FIG. 8 is a diagram depicting an example of an application structure.

FIG. 11 is a diagram depicting another example of displaying a program guide.

FIG. 21 is a block diagram depicting a configuration example of a computer.

DESCRIPTION OF EMBODIMENTS

Hereinafter, embodiments for implementing the present technology will be explained. The explanations will be given in accordance in the following order.

1. First Embodiment (Example of Display Switching in Accordance with On/Off of Screen Reader Function)

2. Second Embodiment (Example of Playable Indicator)

First Embodiment>

<Configuration of Program Distribution System>

Figure 1:
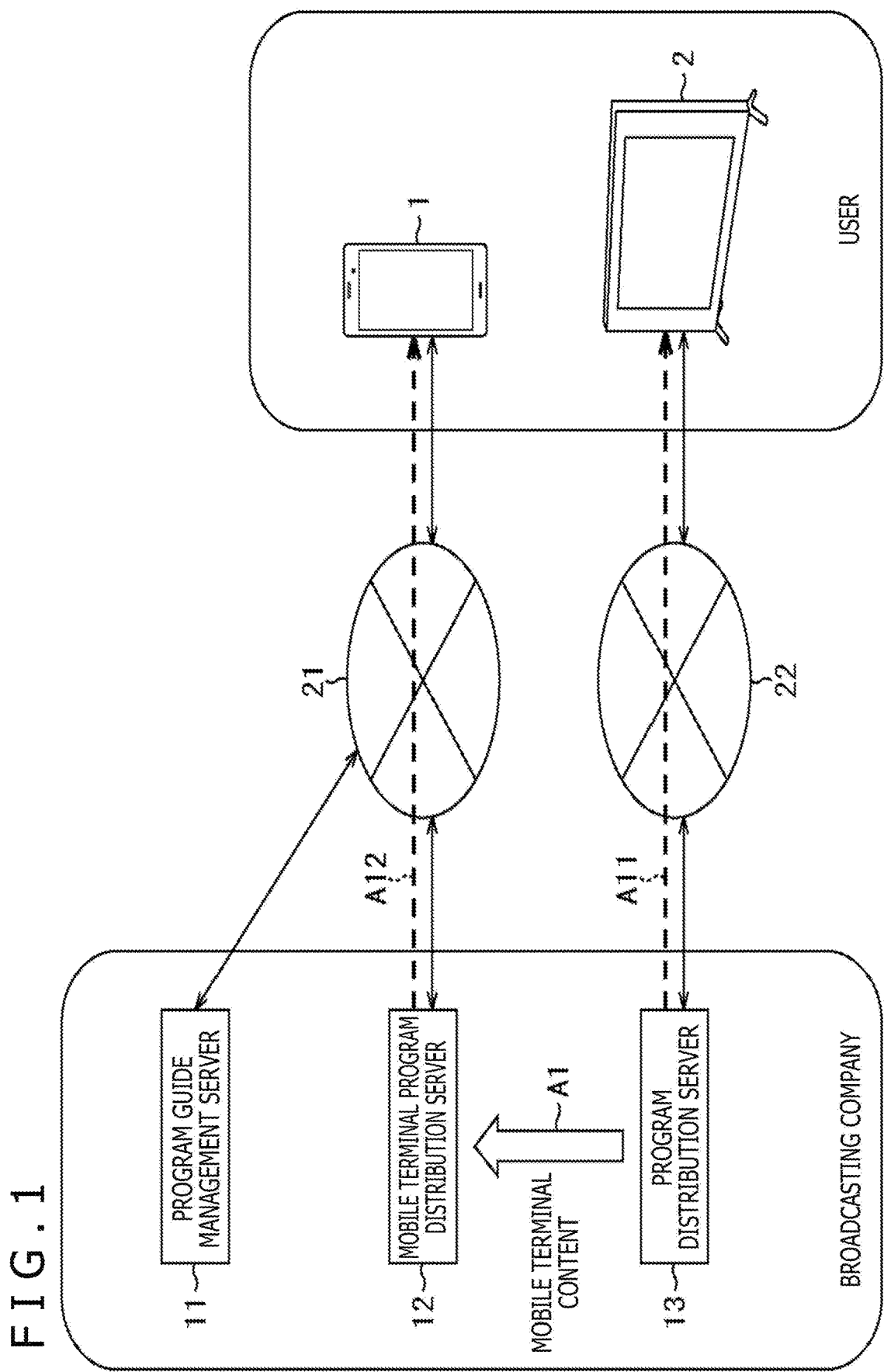
FIG. 1 is a diagram depicting a configuration example of a program distribution system according to one embodiment of the present technology.

FIG. 1 is a diagram depicting a configuration example of a program distribution system according to one embodiment of the present technology.

The program distribution system in FIG. 1 is formed by connecting a mobile terminal 1, a program guide management server 11, and a mobile terminal program distribution server 12 to an internet 21, and by connecting a TV 2 and a program distribution server 13 to a cable television network 22.

As surrounded by a rounded rectangle in the drawing, the mobile terminal 1 and the TV (television receiver) 2 are components on the side of a user who is a viewer of programs (content). The mobile terminal 1 is a mobile information processing terminal such as a smartphone or a tablet terminal. On the other hand, the program guide management server 11, the mobile terminal program distribution server 12, and the program distribution server 13 are components on the side of a broadcasting service provider which is a program providing side such as a CATV company.

In this example, it is assumed that the same user uses the mobile terminal 1 and the TV 2, and the user has entered into an agreement for concluded a contract for a distribution service which is provided by a broadcasting service provider that manages the program distribution server 13, etc. FIG. 1 illustrates a configuration of one user only, but there are actually a plurality of users who views programs by using TVs and mobile terminals, and apparatuses which are used by the users are also provided.

The program guide management server 11 manages information regarding programs that are provided by broadcasting companies, and provides a program guide (EPG (Electronic Program Guide)).

The mobile terminal program distribution server 12 manages mobile terminal programs supplied from the program distribution server 13. The mobile terminal program distribution server 12 distributes the programs by using a plurality of channels in accordance with a predetermined schedule. It is to be noted that, when distributing the programs, the mobile terminal program distribution server 12 uses virtual channels that are defined for services to sequentially transmit a plural programs.

Distribution of programs through the mobile terminal program distribution server 12 is conducted not by what is called an on demand basis but in accordance with a schedule that is preliminarily determined by a broadcasting service provider side. A program distributed by the mobile terminal program distribution server 12 is received by the mobile terminal 1, and is outputted therefrom.

A program distributed by the mobile terminal program distribution server 12 is identical to a program distributed by the program distribution server 13, for example. Distribution of programs through the mobile terminal program distribution server 12 and distribution of programs through the program distribution server 13 may be simultaneously conducted in accordance with the same schedule, or may be conducted in accordance with different schedules. The mobile terminal program distribution server 12 and the program distribution server 13 may be configured to distribute different programs.

The program distribution server 13 distributes programs by using a plurality of channels in accordance with a predetermined schedule. A program distributed by the program distribution server 13 is received by the TV 2, and is outputted therefrom. The program distribution server 13 generates a program for mobile terminals, and provides the program to the mobile terminal program distribution server 12, as indicated by an outlined arrow A1.

For example, when staying at home, the user can view a program distributed over the network 22, as illustrated by an arrow A11, by using the TV 2. Also, for example, when being out, the user can view a program distributed over the internet 21, as illustrated by an arrow A12, by using the mobile terminal 1.

Distribution of programs through the mobile terminal program distribution server 12 may be conducted by using not the internet but a broadcast wave. Also, distribution of programs through the program distribution server 13 may be conducted by using not a cable television network but the internet or a broadcast wave.

Distribution of programs may be conducted by using a transmission path that is formed by combining a cable television network, the internet, and a broadcast wave. Thus, programs can be provided by the mobile terminal program distribution server 12 and the program distribution server 13, with use of various types of transmission paths.

FIG. 2 is a diagram depicting an example of a program guide that is displayed at the mobile terminal 1.

In the program guide depicted in FIG. 2, a vertical direction is defined as a channel direction and a horizontal direction is defined as a time direction. Alternatively, a program guide in which a horizontal direction is defined as a channel direction and a vertical direction is defined as a time direction, may be displayed.

Channels are formed so as to be vertically arranged in a lengthwise band-like channel region 51 formed on the left side of a screen. In the region of each of the channels, a channel name, a channel number, and a channel logo are displayed. In the example in FIG. 2, eight channels are depicted.

Also, times are displayed in a widthwise band-like time region 52 formed in the upper part of the screen. In the example in FIG. 2, a time period from 19:00 to a time after 20:00 is displayed. A small circular pointer 52A displayed in the time region 52 and a broken line extending downward from the pointer 52A indicate the current time.

In a program region 53 formed on the right side of the channel region 51, information regarding programs which are provided by the channels is displayed at positions according to distribution times. In the example in FIG. 2, information including the title of each program is displayed in the region of the program.

For example, the user can switch the range of channels displayed in the program region 53, by performing an upward/downward swipe on the program region 53. Information provided by the program guide management server 11 includes, for example, information regarding 100 channels in addition to the eight channels depicted in FIG. 2. In addition, the user can switch the time period displayed in the program region 53 by performing a leftward/rightward swipe on the program region 53.

The user can display a program guide for another date by tapping either one of triangle marks located on the left and right sides of a date displayed above the time region 52.

A TV viewing application which is a program for receiving and reproducing programs that are distributed by the mobile terminal program distribution server 12, or for receiving information provided by the program guide management server 11 and displaying a program guide, is installed in the mobile terminal 1. The user starts the TV viewing application, selects a certain program from a program guide such as that depicted in FIG. 2, and is thereby allowed to view the program on the mobile terminal 1.

<User Assist Function>

As a user assist function (Accessibility), what is called a screen reader function for voice reading of a description displayed on a screen is installed in the mobile terminal 1. The screen reader function is used for informing visually impaired people of displayed descriptions.

The screen reader function is called a TalkBack function in a case where an OS installed in the mobile terminal 1 is Android (registered trademark), and is called a VoiceOver function in a case where the OS is iOS (registered trademark).

The screen reader function is executed by a screen reader application which is different from the TV viewing application. The user can set the on/off of the screen reader function through a setting screen.

Figure 3:
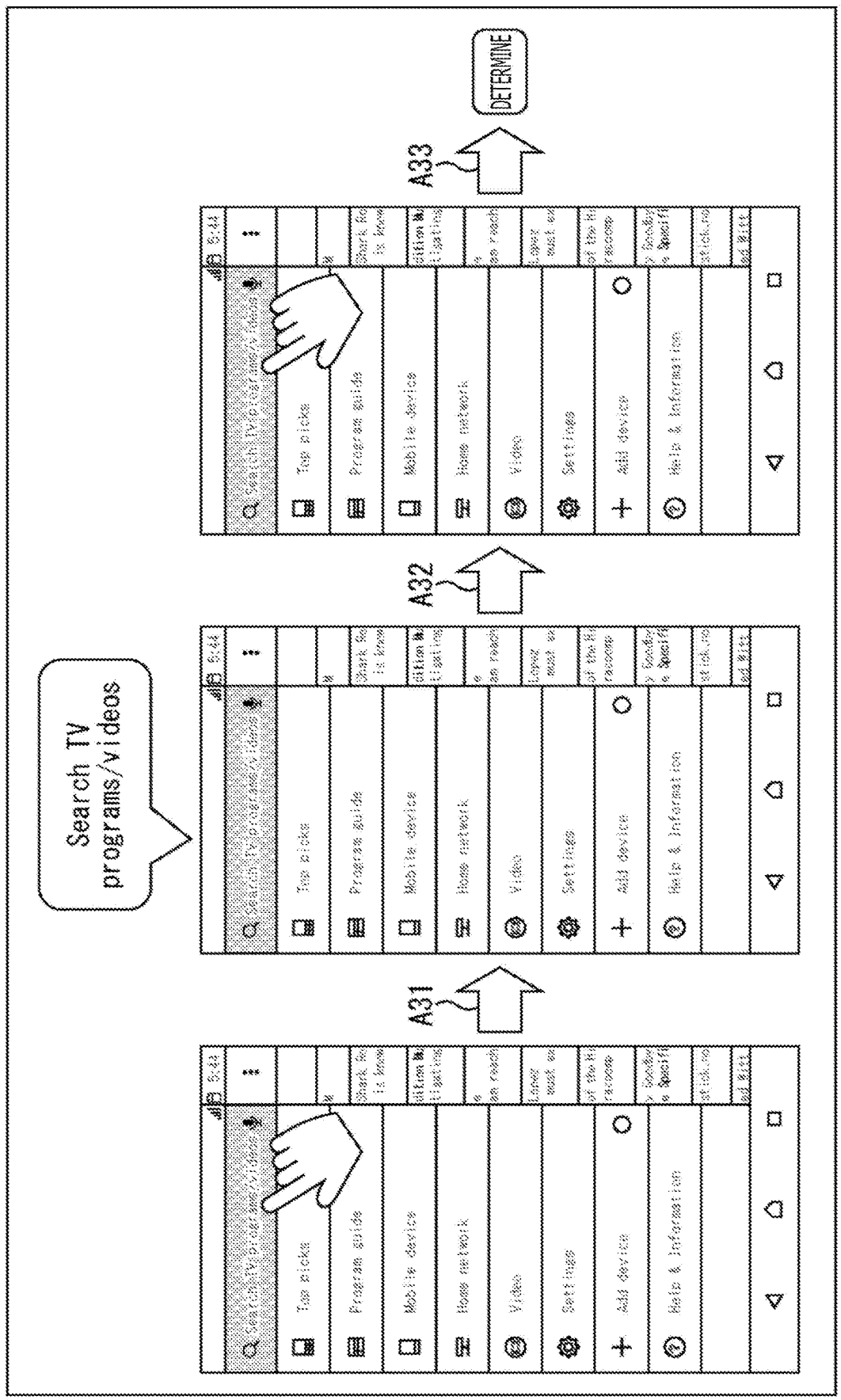
FIG. 3 is a diagram depicting an example of a screen reader function.

FIG. 3 is a diagram depicting an example of the screen reader function.

Each of screens depicted in FIG. 3 is a menu screen of the TV viewing application. When the TV viewing application is started and a predetermined operation is performed, a list of items such as that depicted in FIG. 3 is displayed as the menu screen.

On the menu screen, items such as "Search TV program/videos," "Top picks," and "Program guide" are displayed as selection items in order from the top.

The item "Search TV program/videos" indicates a function of searching for programs and videos. In a case where the item "Search TV program/videos" is selected, a search screen on which a keyword input region is provided is displayed.

The item "Top picks" indicates a top screen on which information regarding programs is presented. In a case where the item "Top picks" is selected, a top screen on which information regarding recommended programs and the like is presented is displayed. The menu screen, a list of programs of each category, a list of programs under distribution, or the like can be displayed from the top screen.

The item "Program guide" indicates a program guide. In a case where the item "Program guide" is selected, a screen of a program guide is displayed.

For example, in a case where the item "Search TV program/videos" is tapped once while the menu screen is displayed, as illustrated in the left screen in FIG. 3, the item "Search TV program/videos" is brought into a selected state (focused state). Also, as indicated by an arrow A31, a "Search TV program/videos" voice expressing a displayed description located at the selected position is outputted.

In a case where the item "Search TV program/videos" is tapped again while the item "Search TV program/videos" is in a selected state, as indicated by an arrow A32, the item "Search TV program/videos" is determined, as indicated by an arrow A33.

Thus, in a case where the screen reader function is on, a voice expressing a displayed description located at a selected position is outputted with a first tap. Furthermore, the selected item is fixed with a second tap.

An item is selected with not only a tap but also a swipe. Alternatively, an item is also selected with a focus dragging.

In a case where a rightward swipe is performed in a state where a screen in which items are arranged in a list format, as depicted in FIG. 3, is displayed, an item next to a selected item is selected and voice reading of a description of the item is performed. By repeating a rightward swipe, the user can sequentially switch a selected item to the next item.

In addition, in a case where a leftward swipe is performed in a state where the screen such as that depicted in FIG. 3 is displayed, an item immediately preceding to the selected item is selected and voice reading of a description of the item is performed. By repeating a leftward swipe, the user can sequentially switch a selected item to the preceding item.

With a screen such as a menu screen on which items are arranged in one direction (one dimension), an order of focusing the items matches the arrangement order of the items. Accordingly, the user can be audibly informed of arrangement of the orders in such a manner that is easy to understand.

Here, a screen such as the program guide in FIG. 2 in which information is displayed in two dimensions with the vertical direction defined as a channel direction and the horizontal direction defined as a time direction, is discussed. In a case where a program to be focused in the program guide is sequentially switched in accordance with a user's operation, it is difficult to inform, buy voice, the user of arrangement of the programs because the programs are distributed at different times, and, information regarding the programs is not displayed in fixed arrangement.

In the mobile terminal 1, the display structure of a program guide can be switched in accordance with whether the screen reader function is on or off.

<Switching Display Structure in Accordance with on/Off of Screen Reader Function>

Figure 4:
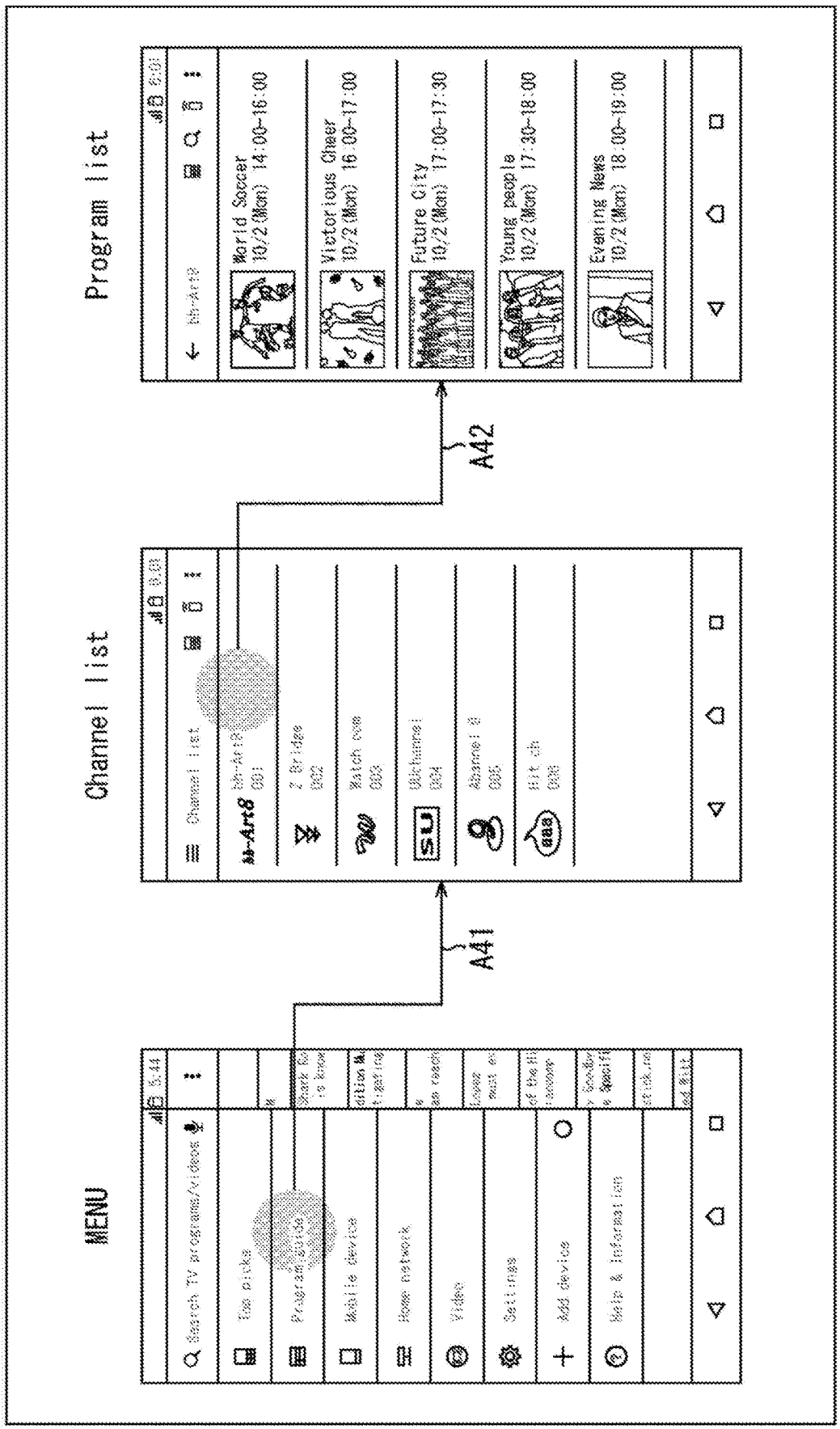
Figure 5:
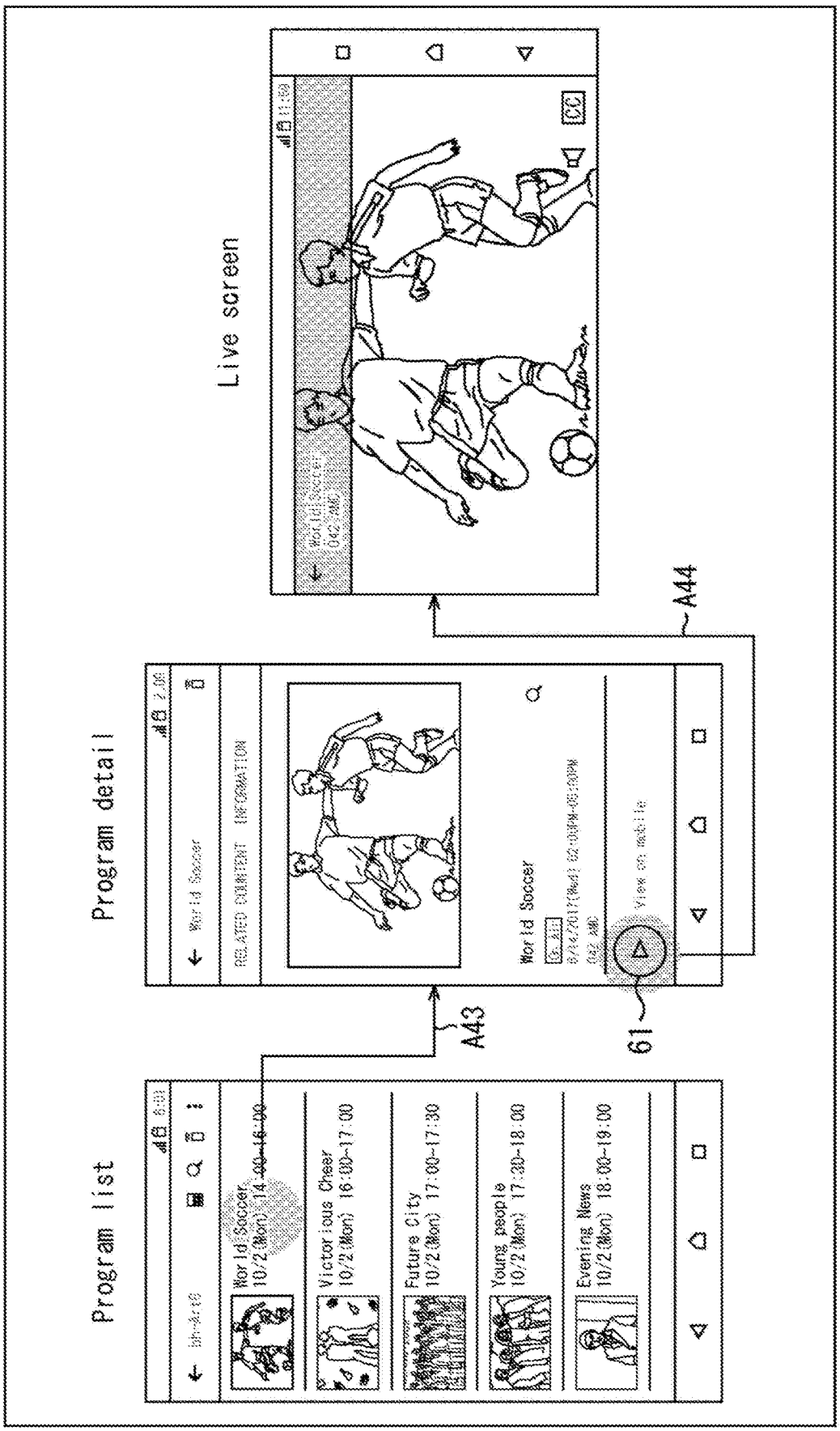

FIGS. 4 and 5 are diagrams each depicting an example of transition of a program guide in a case where the screen reader function is on.

In a case where "Program guide" is selected on a menu screen depicted on the left side in FIG. 4, a channel list is displayed, as indicated by an arrow A41. In FIG. 4, each colored circle indicates that an operation for determining an item has been performed with two successive taps or the like. The same applies to FIG. 5 and subsequent drawings.

In the channel list, channels are displayed as selection items in order from the top. In the region of each of the channels constituting the channel list, a channel name, a channel number, and a channel logo are displayed. In the example in FIG. 4, six channels are displayed.

For example, each time a swipe is performed in a state where the channel list is displayed, a focused channel is switched in order from the channel displayed at the top. The user selects a predetermined channel by listening a reading voice.

In a case where a channel "bh-Art8" located at the top is selected from the channel list, a program list is displayed, as indicated by an arrow A42. The channel list is different in screen layers from the program list.

In the program list, information regarding programs which are distributed through the channel "bh-Art8" selected from channel list is displayed in a time order.

In the example in FIG. 4, five programs that are "World Soccer," "Victorious Cheer," "Future City," "Young people," and "Evening News" are displayed in order. In the region of each of the programs constituting the program list, a thumbnail image, a title, and broadcast date and time of the program are displayed.

The program "World Soccer" is distributed in a time period of 14:00 to 16:00, and the program "Victorious Cheer" is distributed in a time period of 16:00 to 17:00. The program "Future City" is distributed in a time period of 17:00 to 17:30, and the program "Young people" is distributed in a time period of 17:30 to 18:00. The program "Evening News" is distributed in a time period of 18:00 to 19:00.

Each time, for example, a swipe is performed in a state where the program list is displayed, a focused program is switched in order from the program displayed on the top. The user selects a predetermined program by listening to a reading voice.

In a case where the program "World Soccer" located on the top is selected from the program list, a details-of-program screen is displayed, as indicated by an arrow A43 in FIG. 5.

On the details-of-program screen, information regarding the details of the program "World Soccer" is displayed. Each time, for example, a swipe is performed in a state where the details-of-program screen is displayed, a focused description is switched in order from the description displayed on the top. The user checks the details of the program by listening a reading voice.

A viewing start button 61 that is operated to start viewing the program "World Soccer" is displayed in the lower left part of the details-of-program screen. When a swipe is performed, a focus is put on the viewing start button 61. In a case where a tap is performed in this state, reproduction of the program is started so that an image of the program "World Soccer" is displayed, as indicated by an arrow A44.

The mobile terminal 1 starts receiving the program "World Soccer" under distribution by making access to a predetermined URL allocated to the channel "bh-Art8," for example. The mobile terminal 1 displays, on a display, an image of the program by decoding a video stream included in content transmitted from the mobile terminal program distribution server 12, and outputs sounds of the program through a loudspeaker by decoding an audio stream.

Accordingly, in a case where the screen reader function is on, a program guide includes two screens in different layers that are a channel list and a program list in different layers.

In the channel list, channels which are selection items are arranged in one direction, and an order of focusing on the channels matches the arrangement order of the channels. Accordingly, the user can be informed of arrangement of the channels by voice in such a manner that is easy to understand.

In addition, in the program list, programs which are selection items are arranged in one direction, and an order of focusing on the programs matches the arrangement order of the programs. Accordingly, the user can be informed of arrangement of the programs by voice in such a manner that is easy to understand.

Figure 6:
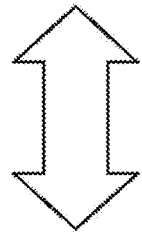
FIG. 6 is a diagram depicting an example of switching a screen structure according to the on/off of a screen reader function.

FIG. 6 is a diagram depicting an example of switching a screen structure in accordance with the on/off of the screen reader function.

In a case where the screen reader function is on, a structure having two layers, i.e., a channel list and a program list, as depicted on the left side in FIG. 6, is displayed upon an instruction for displaying a program guide.

On the other hand, in a case where the screen reader function is off, a program guide, such as that having been explained with reference to FIG. 2, in which the vertical direction is defined as a channel direction, the horizontal direction is defined as a time direction, and information regarding programs is arranged at corresponding positions, is displayed, as depicted on the right side in FIG. 6. The program guide in FIG. 2 can be regarded as a program guide having a one-layer structure.

Accordingly, by switching the structure of a program guide in accordance with whether the screen reader function is on or off, a program guide that is easy to understand can be presented to a user.

Hereinafter, a program guide provided when the screen reader function is on is referred to as a program guide in a list format, as appropriate, because the program guide includes two lists: a channel list and a program list. In addition, a program guide provided when the screen reader function is off is referred to as a program guide in a grid format because the vertical direction is defined as a channel direction, the horizontal direction is defined as a time direction, and information regarding programs is arranged at corresponding positions.

Processing at the mobile terminal 1 in which display of a program guide is controlled as described above will be explained later with reference to a flowchart.

<Configuration Example of Mobile Terminal>

Figure 7:
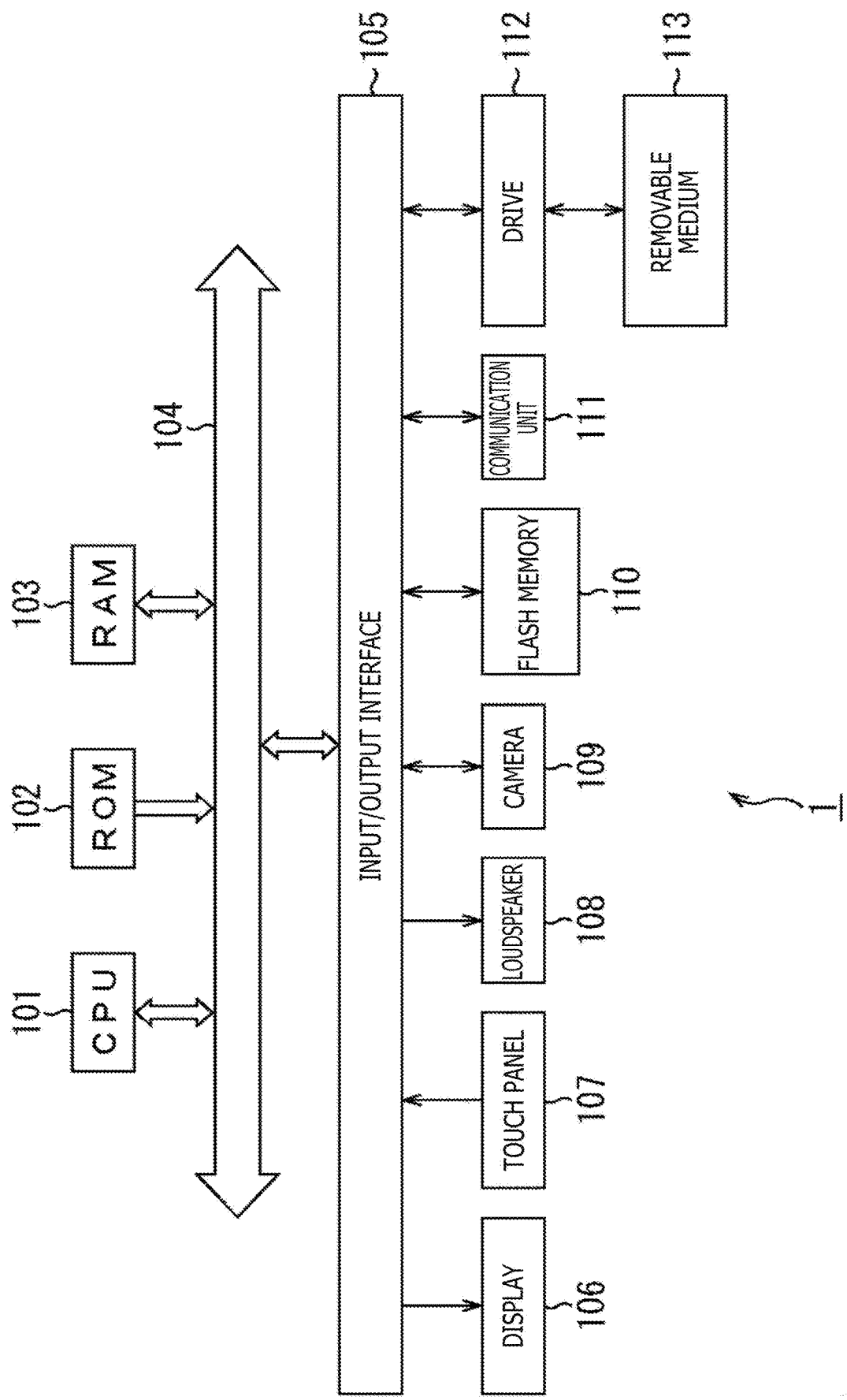
FIG. 7 is a block diagram depicting a hardware configuration example of a mobile terminal.

FIG. 7 is a block diagram depicting a hardware configuration example of the mobile terminal 1.

A CPU (Central Processing Unit) 101, a ROM (Read Only Memory) 102, and a RAM (Random Access Memory) 103 are mutually connected via a bus 104.

Further, an input/output interface 105 is connected to the bus 104. A display 106, a touch panel 107, a loudspeaker 108, a camera 109, a flash memory 110, a communication unit 111, and a drive 112 are connected to the input/output interface 105.

The display 106 includes an LCD, an organic EL display, or the like. The display 106 displays various screens such as those described above.

The touch panel 107 detects a user's operation on a surface of the display 106, and outputs information indicating the details of the user's operation.

The loudspeaker 108 outputs various sounds including voices provided by the screen reader function, sounds of programs, and music.

The camera 109 performs photographing in accordance with a user's operation, and outputs image data.

The flash memory 110 stores various kinds of data including a program which is executed by the CPU 101.

The communication unit 111 is an interface for wireless communication. The communication unit 111 communicates with external apparatuses such as the program guide management server 11 and the mobile terminal program distribution server 12 which are connected over the internet 21.

The drive 112 drives a removable medium 113 such as a memory card, and writes data into the removable medium 113 and reads out data stored in the removable medium 113.

FIG. 8 is a diagram depicting an example of an application structure.

As depicted in FIG. 8, a plurality of applications which is operated through an OS is installed in the mobile terminal 1. Besides the aforementioned TV viewing application and the aforementioned screen reader application, a Web browser, an e-mail management application, and a music reproduction application are included in the example in FIG. 8.

Through the Web browser, a Web page is displayed on the basis of information received from a server on the internet 21. The e-mail management application is a mailer to manage transmission and reception of e-mails. The music reproduction application reproduces music data stored in the memory of the mobile terminal 1 and music data received over the internet 21, and outputs the music through a loudspeaker of the mobile terminal 1.

Figure 9:
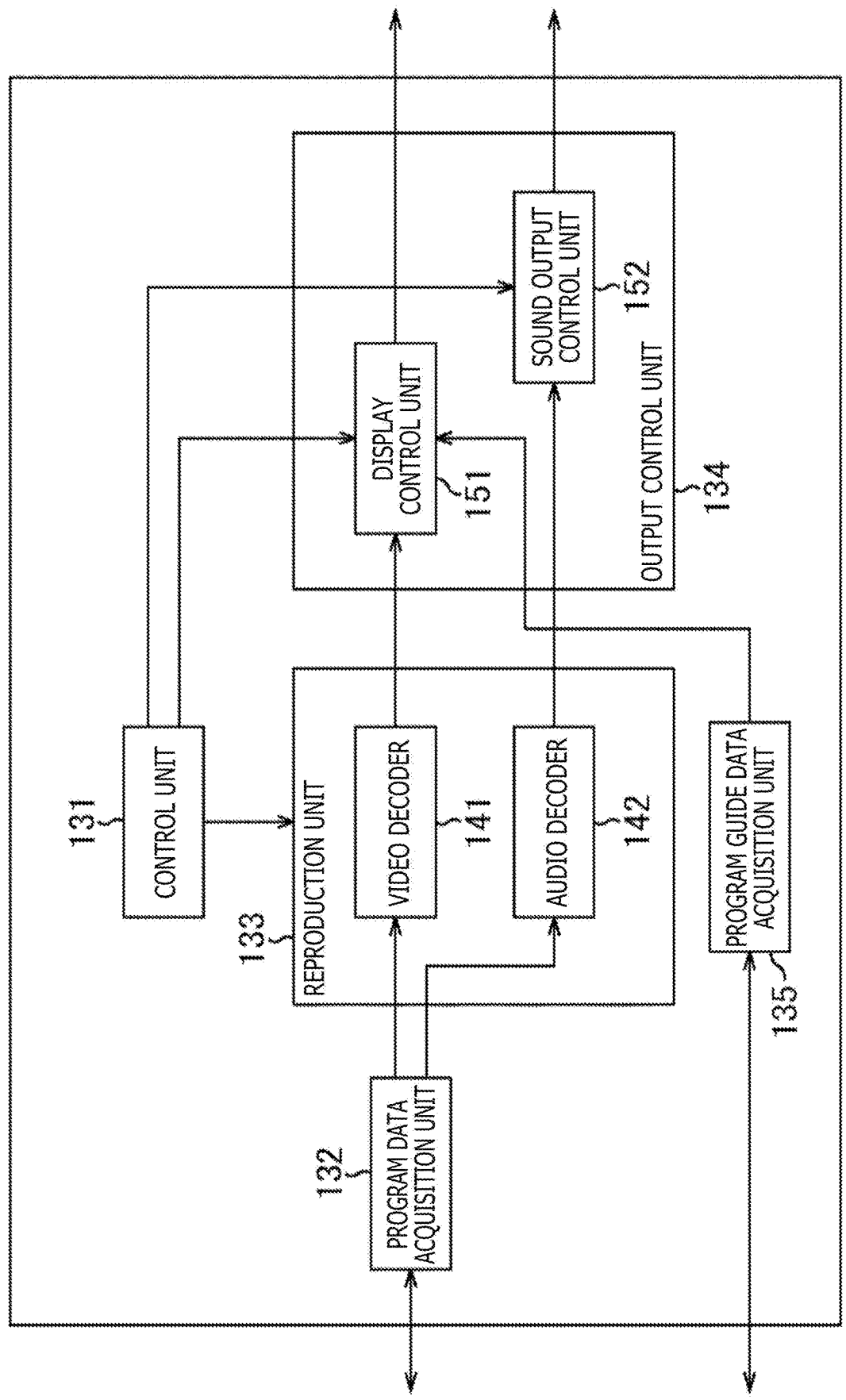
FIG. 9 is a block diagram depicting a functional configuration example of a mobile terminal.

FIG. 9 is a block diagram depicting a functional configuration example of the mobile terminal 1.

At least a part of the functional units in FIG. 9 is implemented by the CPU 101 in FIG. 7 executing the TV viewing application and the screen reader application.

In the mobile terminal 1, a control unit 131, a program data acquisition unit 132, a reproduction unit 133, an output control unit 134, and a program guide data acquisition unit 135 are implemented. The reproduction unit 133 includes a video decoder 141 and an audio decoder 142. The output control unit 134 includes a display control unit 151 and a sound output control unit 152.

The control unit 131 controls reproduction of program data through the reproduction unit 133, display of images of a program through the display control unit 151, and output of sounds of a program through the sound output control unit 152.

Further, in a case where the screen reader function is on, the control unit 131 switches a focused target in accordance with a user's operation. The control unit 131 controls the sound output control unit 152 to output a voice expressing a displayed description located at a focused position.

The program data acquisition unit 132 acquires data about a program to be reproduced. For example, in a case where a predetermined channel is selected from a program guide, the program data acquisition unit 132 controls the communication unit 111 to make access to the mobile terminal program distribution server 12 and start receiving data about a program.

The program data acquisition unit 132 extracts video data from the received program data and outputs the video data to the video decoder 141 of the reproduction unit 133, and extracts audio data and outputs the audio data to the audio decoder 142.

The video decoder 141 of the reproduction unit 133 decodes video data about the program, and outputs, to the display control unit 151, the program image data obtained by decoding.

The audio decoder 142 decodes audio data about the program, and outputs, to the sound output control unit 152, the program sound data obtained by decoding.

The display control unit 151 displays an image of the program on the display 106 on the basis of data supplied from the video decoder 141. Further, the display control unit 151 displays a program guide on the display 106 on the basis of the data supplied from the program guide data acquisition unit 135. The structure of the program guide to be displayed by the display control unit 151 can be switched under control of the control unit 131.

The sound output control unit 152 outputs sounds of the program from the loudspeaker 108 on the basis of data supplied from the audio decoder 142. Further, in a case where the screen reader function is on, the sound output control unit 152 outputs a voice expressing a displayed description from the loudspeaker 108 under control of the control unit 131.

The program guide data acquisition unit 135 communicates with the program guide management server 11 by controlling the communication unit 111, and acquires data about a program guide. The program guide data acquisition unit 135 outputs the acquired program guide data to the display control unit 151.

<Operation of Mobile Terminal>

Figure 10:
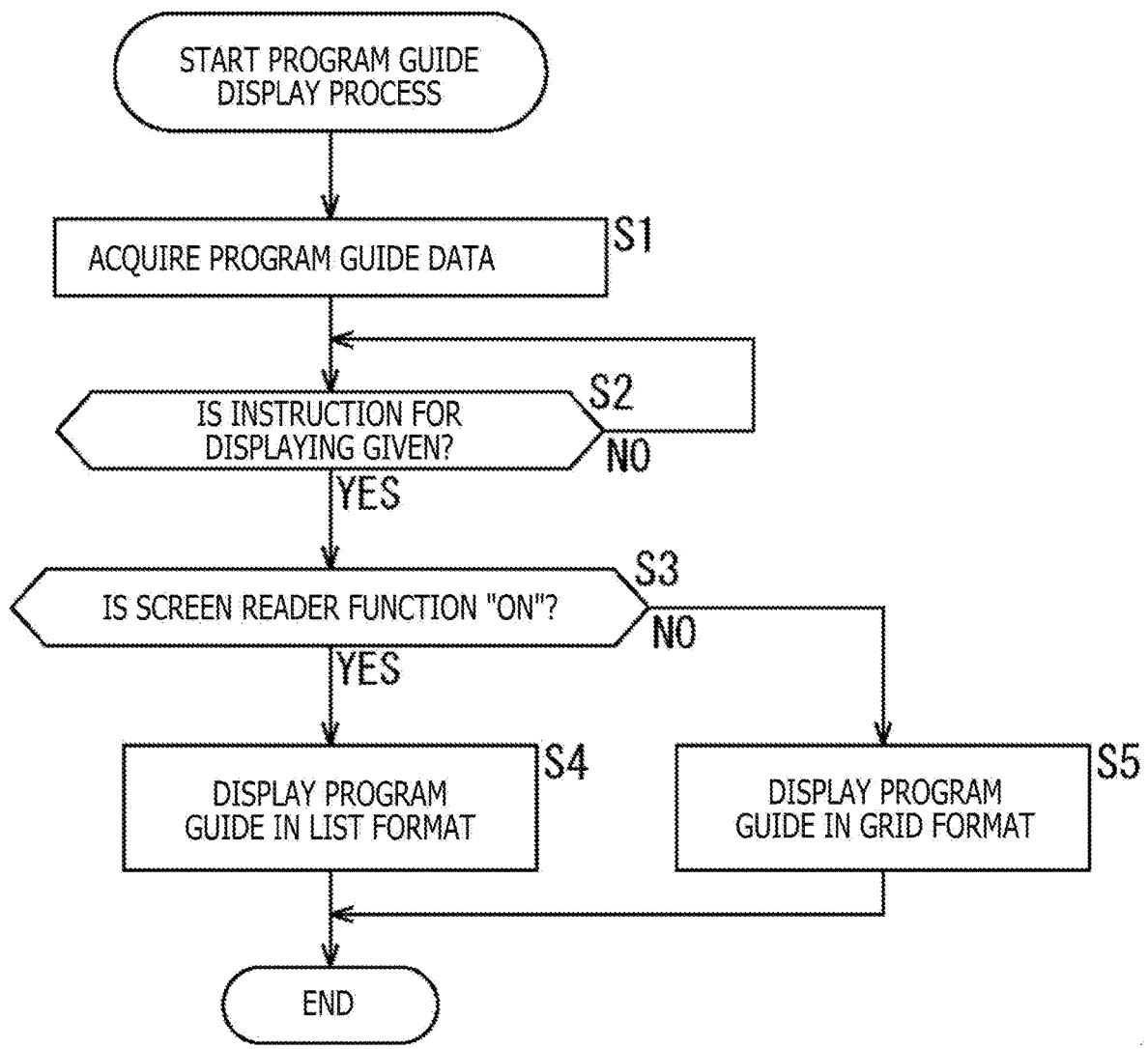
FIG. 10 is a flowchart for explaining a program guide display process at a mobile terminal.

Here, a process for displaying a program guide at the mobile terminal 1 will be explained with reference to a flowchart in FIG. 10.

In step S1, the program guide data acquisition unit 135 acquires data about a program guide by communicating with the program guide management server 11.

In step S2, the control unit 131 determines whether or not an instruction for displaying a program guide has been given, and is on standby until determining that an instruction for displaying a program guide has been given. In a case where the item "Program guide" is selected from a menu screen such as that depicted in FIG. 3, and an instruction for displaying a program guide is determined to have been given in step S2, the process proceeds to step S3.

In step S3, the control unit 131 determines whether or not the screen reader function is on.

In a case where the screen reader function is determined to be on in step S3, the control unit 131 controls the display control unit 151 in step S4 to display a program guide in a list format such as that having been explained with reference to FIGS. 4 and 5.

On the other hand, in a case where the screen reader function is determined to be off in step S3, the control unit 131 controls the display control unit 151 in step S5 to display a program guide in a grid format such as that having been explained with reference to FIG. 2.

After the program guide in a list format is displayed in step S4, or after the program guide in a grid format is displayed in step S5, the process ends. The user selects a predetermined program from the program guide, and starts viewing the program.

As described so far, the structure of a program guide is switched in accordance with whether the screen reader function is on or off, whereby a program guide that is easy to understand can be presented to a user.

In the aforementioned explanation, a program guide in a list format includes screens in two layers: a channel list and a program list. However, a program guide in a list format may include screens in three or more layers.

Second Embodiment

<Displaying Program Guide>

Figure 11:
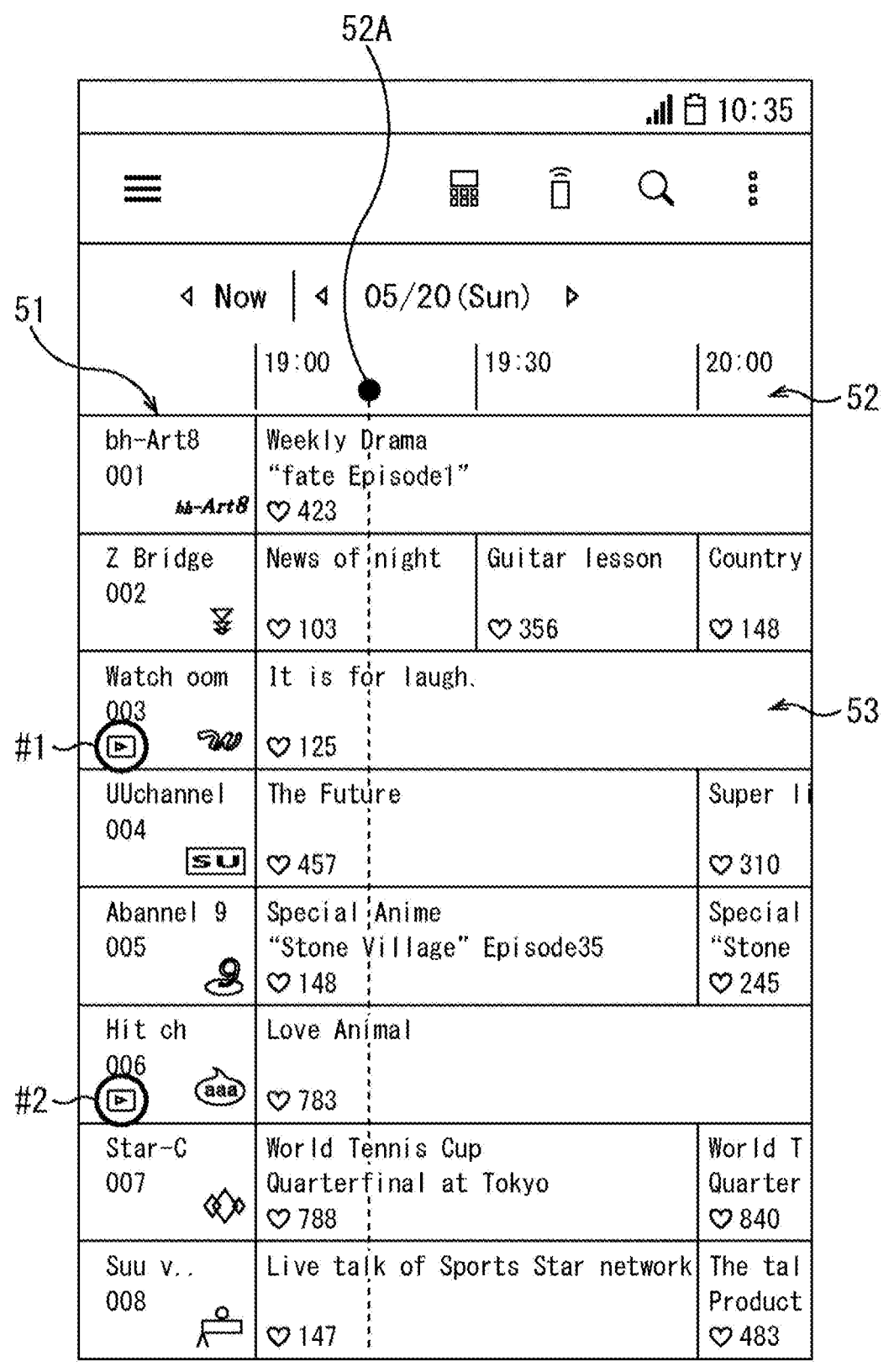

FIG. 11 is a diagram depicting another example of a program guide.

The program guide depicted in FIG. 11 is different from the program guide in FIG. 2 in that Playable Indicators are displayed in the regions of respective predetermined channels, as indicated by circles #1 and #2.

The Playable Indicators are icons each indicating a channel that is viewable at the mobile terminal. The Playable Indicators are information associated with not respective programs but respective channels. In the example in FIG. 11, each of the Playable Indicators is an image formed by putting a rightward triangle in a rounded rectangle. However, another image may be used therefor.

In the example in FIG. 11, "Watch oom" which is the third channel from the top and "Hit ch" which is the sixth channel from the top have been contracted, and programs which are distributed through the two channels are viewable to the user. The user is not allowed to view programs of other channels with no Playable Indicator displayed.

For example, in order to view programs which are distributed by the mobile terminal program distribution server 12 and the program distribution server 13, conclusion of contracts for respective channels are required. Such a mark indicating a viewable channel is provided in a program guide in which both information regarding a viewable channel and information regarding an unviewable channel are included, whereby the user can easily confirm the viewable channel.

The program guide data acquisition unit 135 (FIG. 9) implemented by the TV viewing application acquires contraction information regarding the user of the mobile terminal 1 from, for example, the program guide management server 11, and uses the contract information in displaying a Playable Indicator. The program guide management server 11 manages contract information including information regarding a contracted channel for each user. The contract information indicates a channel that is viewable to each user.

The contract information may be managed by a server different from the program guide management server 11.

Figure 12:
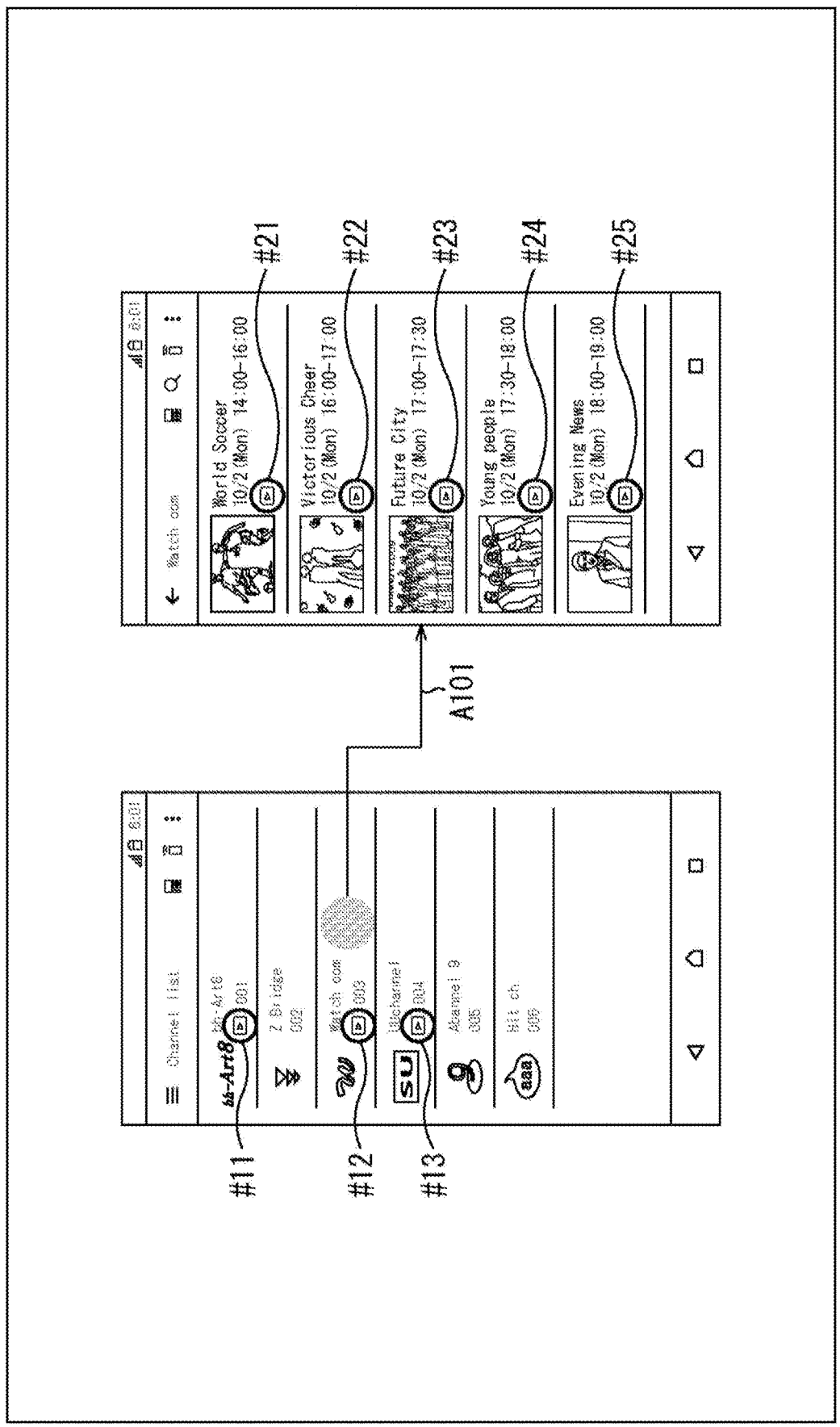
FIG. 12 is a diagram depicting an example of displaying a program guide in a list format.

FIG. 12 is a diagram depicting an example of a program guide in a list format.

A Playable Indicator is also displayed on a program guide in a list format which is displayed when the screen reader function is on.

A channel list depicted on the left side in FIG. 12 is different from the channel list in FIG. 4 in that Playable Indicators are displayed in the regions of three channels, as indicated by circles #11, #12, and #13. These three channels are viewable to the user.

For example, in a case where "Watch oom" which is the third channel from the top is selected, a list of programs which are distributed through the channel "Watch oom" is displayed, as indicated by an arrow A101. In the list of programs, information regarding thumbnail images, titles, and distribution dates and times of the programs is displayed.

Since the channel "Watch oom" itself is viewable, Playable Indicators are displayed in the regions of all the programs which are distributed by the channel "Watch oom," as indicated by circles #21 to #25.

As described so far, Playable Indicators are used in displaying both a program guide in a grid format and a program guide in a list format.

<Displaying Other Screens>

A Playable Indicator is also used in displaying a screen, other than a program guide, on which information regarding channels is displayed.

For example, a Playable Indicator is used in displaying the following screens.

Figure 13:
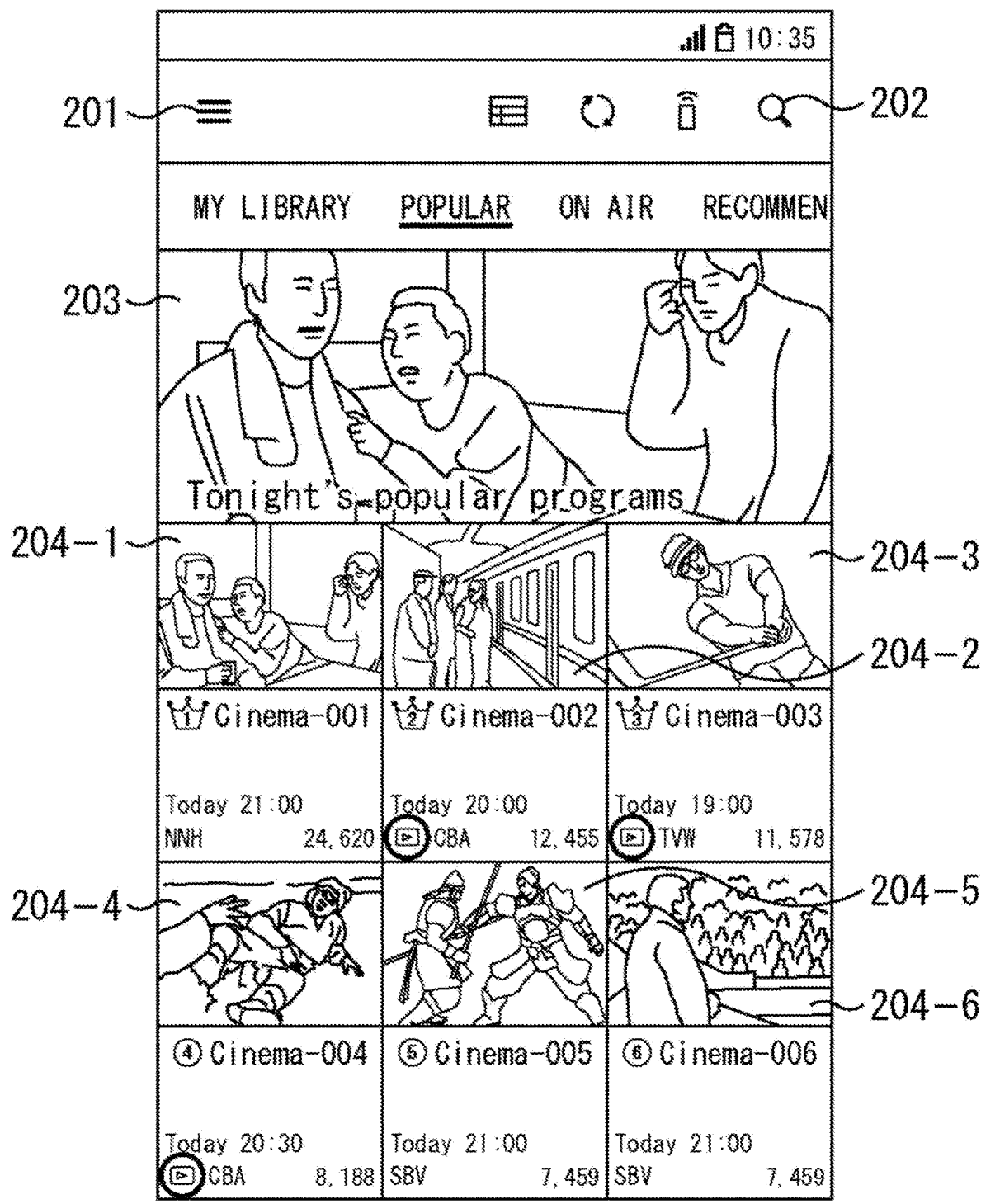
FIG. 13 is a diagram depicting an example of displaying a top screen.

Channel setting screen
Top screen ("Top picks")
Search result display screen
My Keyword search screen
Bookmark list Example of Top Screen FIG. 13 is a diagram depicting a display example of a top screen.

The top screen is displayed immediately after the TV viewing application is started. A menu icon 201 is displayed on the upper left part of the top screen, and a search icon 202 is displayed on the upper right part of the top screen. When the menu icon 201 is tapped, a menu screen such as that having been explained with reference to FIG. 3 is displayed. Also, when the search icon 202 is tapped, a program search screen is displayed.

As illustrated in FIG. 13, a plurality of tile regions is formed on the top screen, and information regarding a predetermined program such as a recommended program is displayed in each of the tile regions. In the example in FIG. 13, a tile region 203 having a horizontally long rectangular shape is formed on the upper side, and tile regions 204-1 to 204-6 each having a vertically long rectangular shape are formed below the tile region 203 so as to be arranged in two lines and three columns.

A thumbnail image of one program is displayed in the entire tile region 203, and information regarding a thumbnail image of a program, a title of the program, and the broadcast date and time thereof is displayed in each of the tile regions 204-1 to 204-6. As indicated by circles, respective Playable Indicators are displayed in the tile regions 204-2, 204-3, and 204-4 among the tile regions 204-1 to 204-6.

The Playable Indicators displayed in the tile regions 204-2, 204-3, and 204-4 indicate that respective channels which distribute the programs displayed in the tile regions 204-2, 204-3, and 204-4 are viewable channels.

It is to be noted that the top screen depicted in FIG. 13 is a screen in the first layer of the top screen. The top screen has a structure including a plurality of layers. In the case where a predetermined operation such as an operation for displaying more programs is performed on the first layer screen in FIG. 13, display of the top screen is switched to display of the second layer depicted in FIG. 14.

Figure 14:
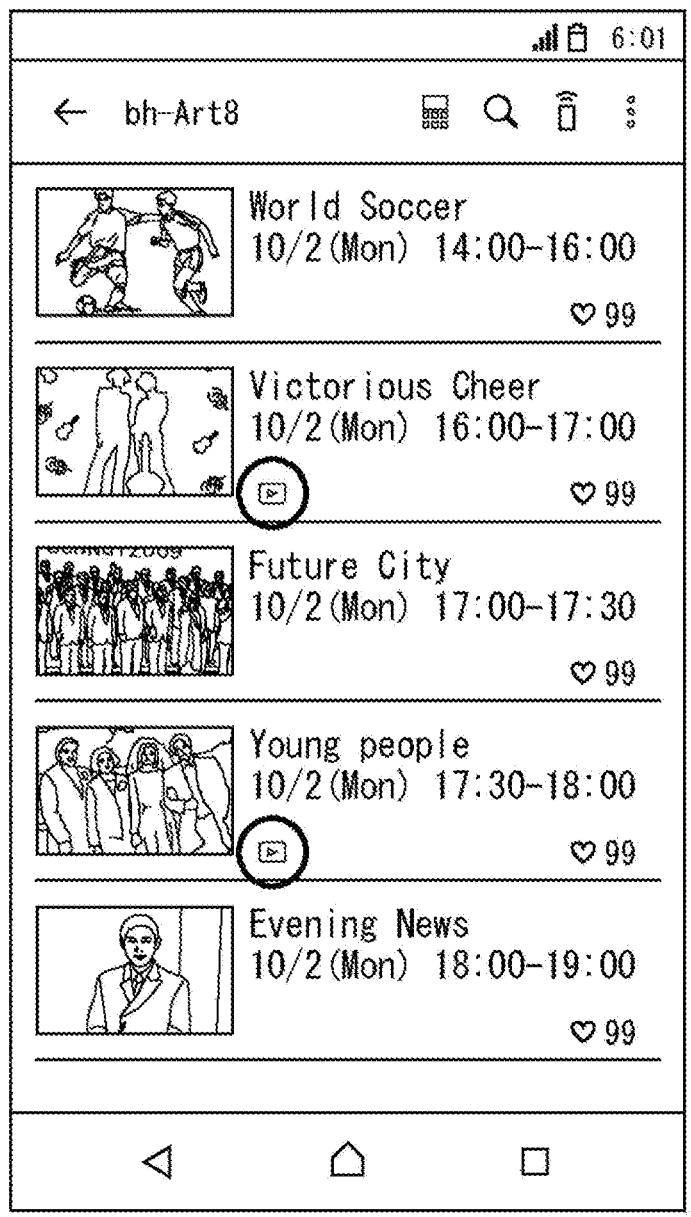
FIG. 14 is a diagram depicting an example of displaying a top screen.

As depicted in FIG. 14, recommended programs, etc. are displayed in a list format on the second layer screen. Also, in the second layer screen, Playable Indicators are displayed in the region of programs which are distributed through the viewable channel, as indicated by circles.

Thus, Playable Indicators are also used in displaying the top screen. The user can confirm which program, among programs displayed on the top screen, is distributed through the viewable channel.

Example of Channel Setting Screen

Figure 15:
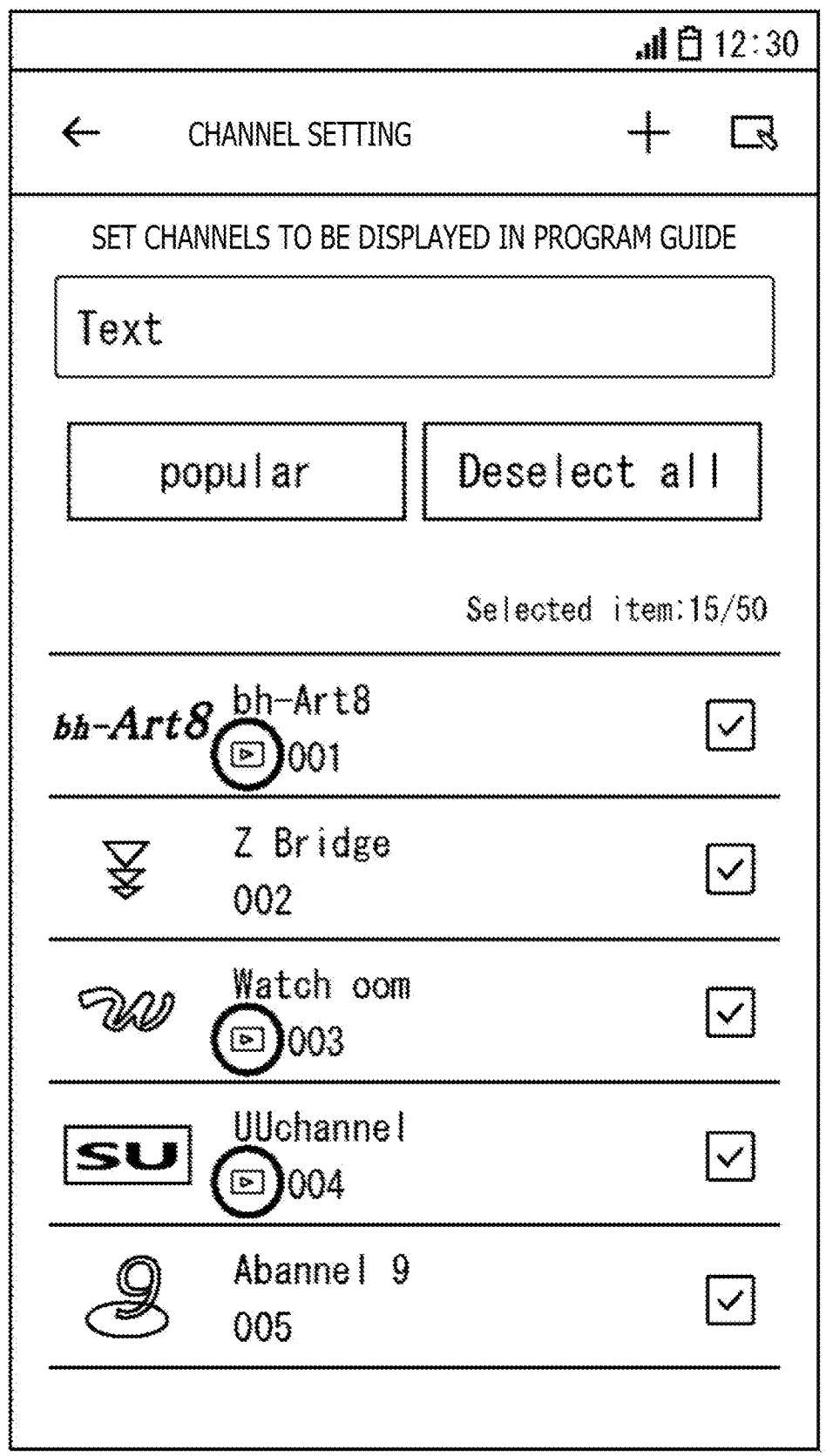
FIG. 15 is a diagram depicting an example of displaying a channel setting screen.

FIG. 15 is a diagram depicting an example of displaying a channel setting screen.

The channel setting screen is used in setting a channel to be displayed in a program guide. The channel setting screen is displayed when an item for setting ("Settings") is selected from the menu screen, for example.

As illustrated in FIG. 15, a list of channels selectable as channels to be displayed in a program guide is displayed on the channel setting screen. In the example in FIG. 15, five channels are displayed among 50 channels. The user can display other channels by performing an upward/downward swipe.

A checkbox is provided to the right side of the region of each of the channels. The user selects a channel to be displayed in a program guide, by checking or unchecking the checkbox.

In the region of each of the channels, a channel name, a channel number, and a channel logo are displayed. In addition, Playable Indicators are displayed in the regions of three channels, as indicated by circles. These three channels are viewable to the user.

Figure 16:
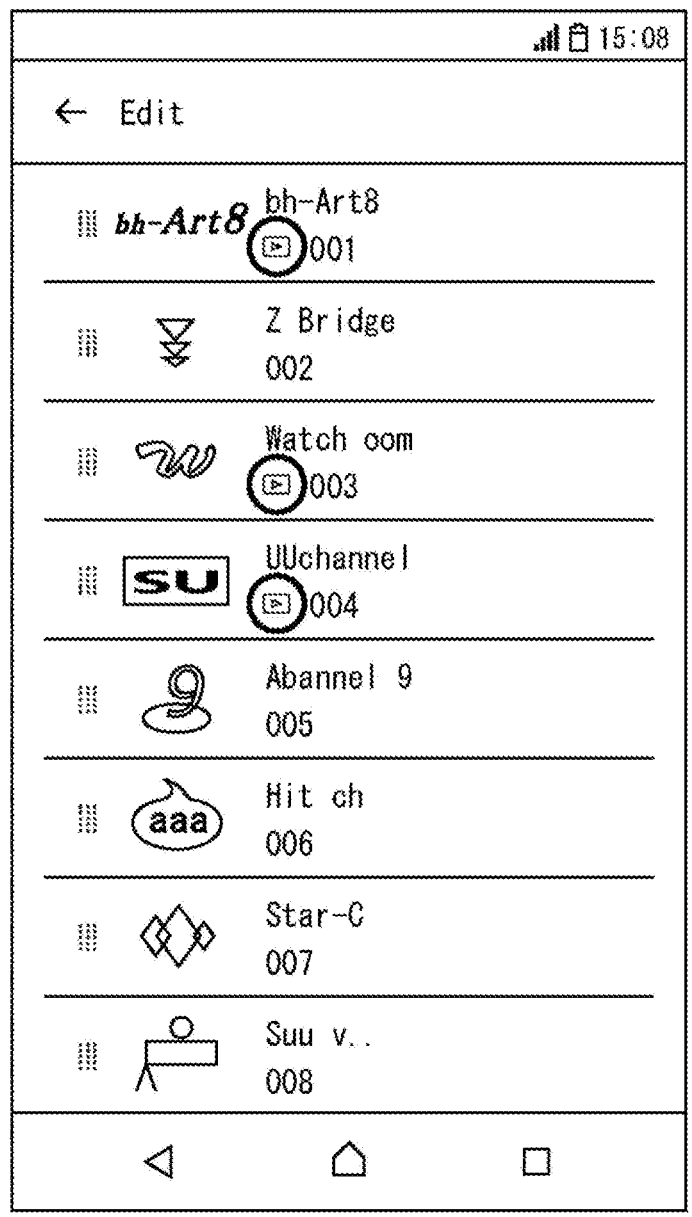
FIG. 16 is a diagram depicting an example of displaying a channel editing screen.

FIG. 16 is a diagram depicting an example of displaying a channel editing screen.

The channel editing screen is used for editing the display order of channels in a program guide. For example, the channel editing screen is displayed after channels are selected by use of the channel setting screen in FIG. 15.

A list of the channels selected by use of the channel setting screen in FIG. 15 is displayed on the channel editing screen. The user presses and holds the region of a predetermined channel, and moves the region to the position of the region of another channel while keeping the holding state so that the display order of channels can be reordered.

Also on the channel editing screen in FIG. 16, a channel name, a channel number, and a channel logo are displayed in the region of each of the channels. In addition, Playable Indicators are displayed in the regions of three viewable channels, as indicated by circles.

As described so far, Playable Indicators are also used in displaying the channel setting screen and the channel editing screen. The user can confirm which channel is viewable among channels displayed on the channel setting screen and the channel editing screen.

Search Result Display Screen

Figure 17:
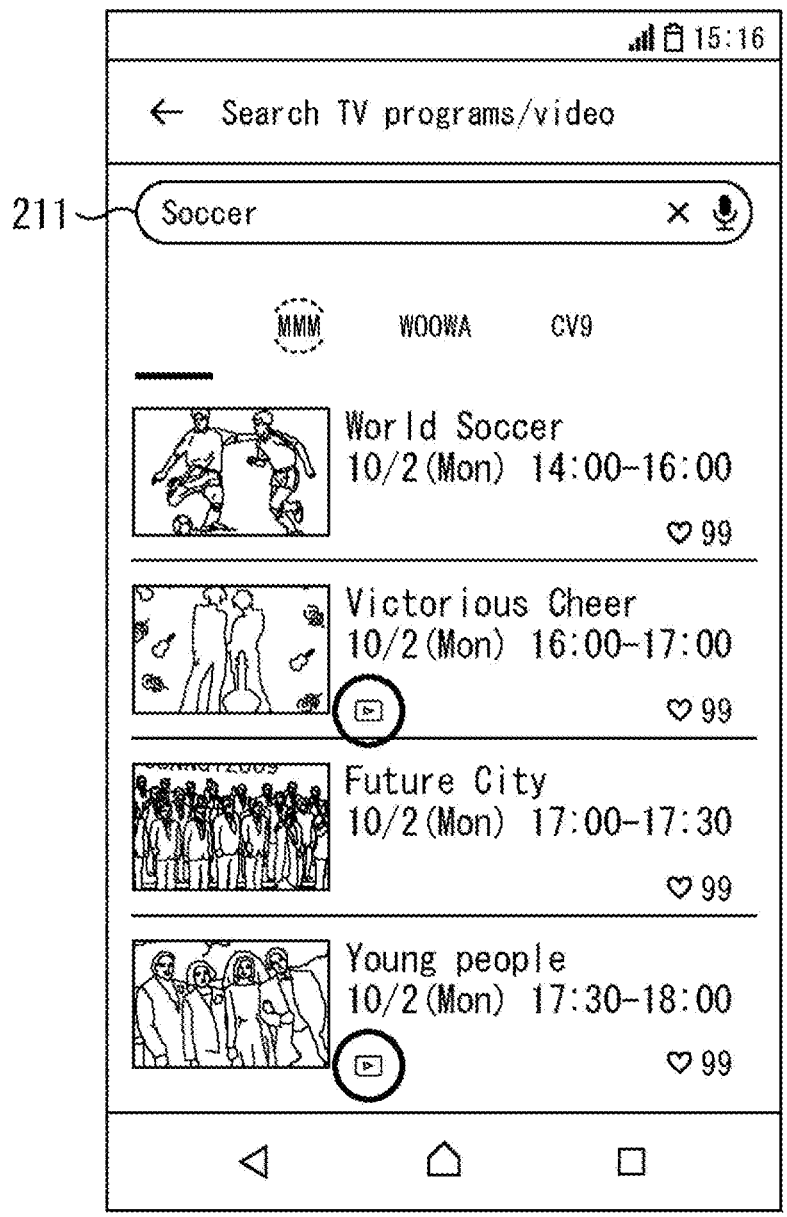
FIG. 17 is a diagram depicting an example of a program search screen.

FIG. 17 is a diagram depicting an example of a program search screen.

A keyword input column 211 is provided on the upper part of a search screen. Program searching is conducted on the basis of a keyword inputted to the input column 211, and a program list of the search result is displayed below the input column 211. By the control unit 131, program searching is conducted on programs included in program guide data acquired by the program guide data acquisition unit 135.

Information regarding thumbnail images, titles, and distribution dates and times of respective programs is displayed in a list of programs displayed below the input column 211. In addition, a Playable Indicator is displayed in the regions of each of programs, among the programs listed in the search result, which are provided through viewable channels, as surrounded by a circle. In the example in FIG. 17, two programs are depicted as programs which are distributed through viewable channels.

In a case where a predetermined program is selected from among programs listed in the search result, display of the search screen is switched to a details-of-program screen on which information regarding the details of the selected program is displayed.

Figure 18:
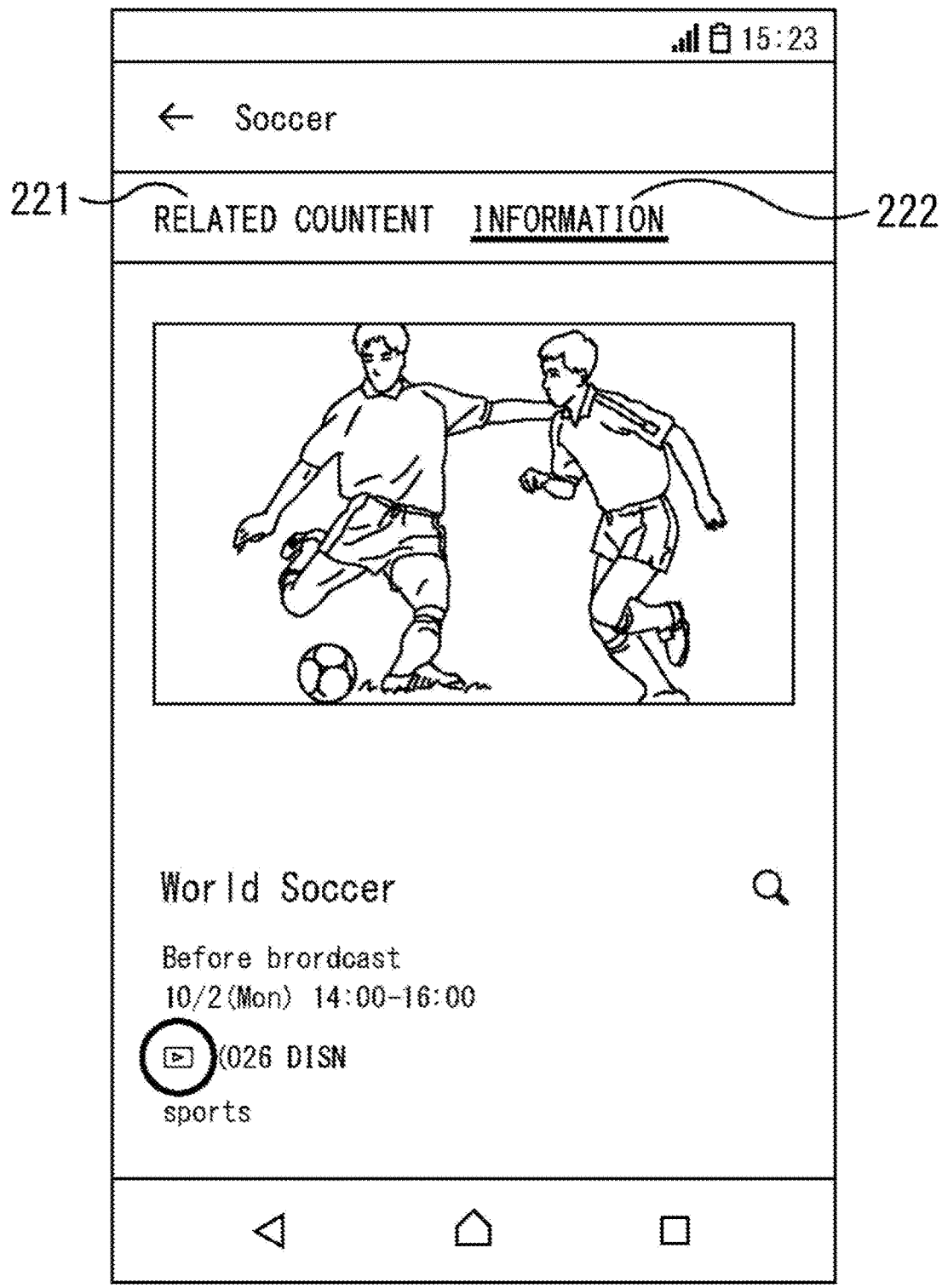
FIG. 18 is a diagram depicting an example of displaying a details-of-program screen.

FIG. 18 is a diagram depicting an example of displaying a details-of-program screen.

A tab 221 which is selected to display related content and a tab 222 which is selected to display detailed information are displayed on the upper part of the details-of-program screen. In the example in FIG. 18, the tab 222 is in a selected state.

As depicted in FIG. 18, a thumbnail image of the program selected from the search screen in FIG. 17 is displayed in an enlarged manner below the tab 221 and the tab 222. Below the thumbnail image, detailed information such as the title is displayed. In a case where a program about which the detailed information is displayed is to be distributed through a viewable channel, a Playable Indicator is displayed therefor, as indicated by a circle in FIG. 18.

Figure 19:
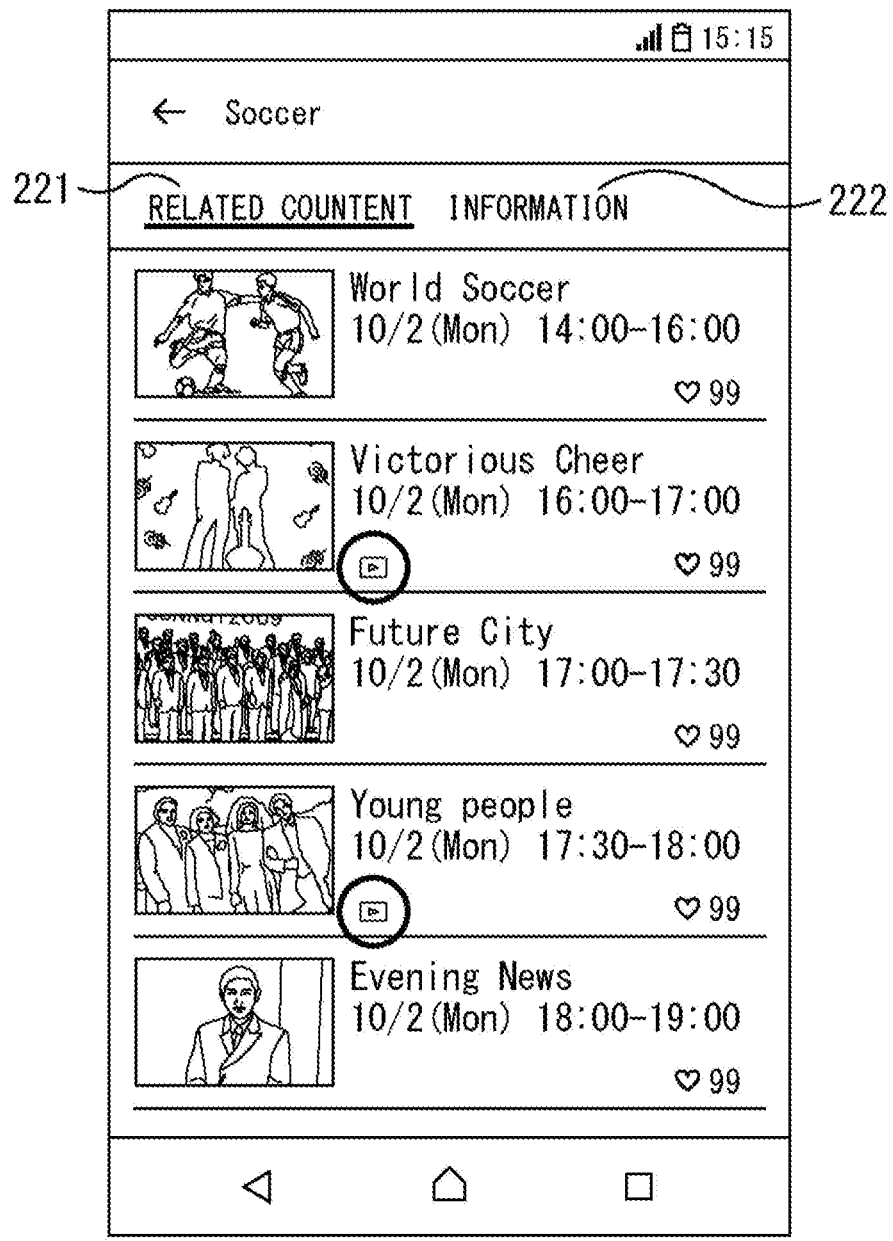
FIG. 19 is a diagram depicting an example of a screen displaying a search result of a related program.

FIG. 19 is a diagram depicting an example of a display screen of a search result of related programs.

The screen in FIG. 19 is displayed in place of the details-of-program screen in FIG. 18 when, for example, the tab 221 in FIG. 18 is selected. A list of related programs is displayed below the tab 221 and the tab 222. By the control unit 131, program searching is conducted on programs included in the program guide data acquired by the program guide data acquisition unit 135.

In the list of related programs, information regarding a thumbnail image, a title, distribution date and time of each of the programs is displayed. In addition, a Playable Indicator is displayed in the region of a program, among related programs, which is distributed through a viewable channel, as surrounded by a circle. In the example in FIG. 19, two programs are depicted as programs which are distributed through a viewable channel.

As described so far, a Playable Indicator is used in displaying a display screen of a program search result, a details-of-program screen, and a display screen of a related-program search result. The user can confirm which program, among programs displayed in each of the screens, is distributed by a viewable channel.

A Playable Indicator is displayed, as appropriate, on the My Keyword search screen on which a program search result obtained by searching based on a registered keyword is displayed, and on a screen for displaying a bookmark list that is a list of programs for each of which a bookmark is registered.

Thus, a Playable Indicator can be displayed on each of various screens for displaying information regarding channels.

<Operation of Mobile Terminal>

Figure 20:
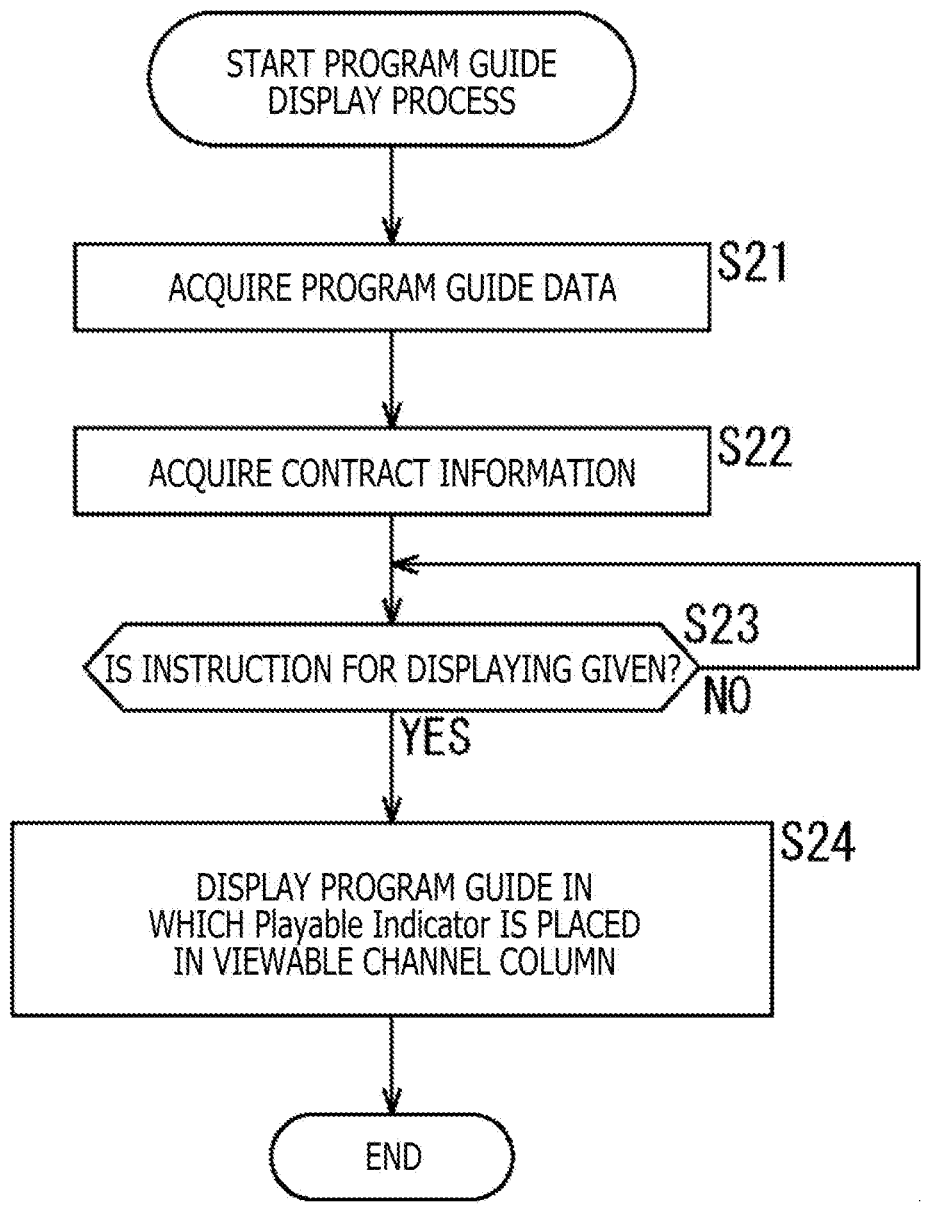
FIG. 20 is a flowchart depicting a program guide display process at a mobile terminal.

Here, a process of displaying a program guide including a Playable Indicator at the mobile terminal 1 will be explained with reference to a flowchart in FIG. 20.

In step S21, the program guide data acquisition unit 135 acquires data about a program guide by communicating with the program guide management server 11.

In step S22, the program guide data acquisition unit 135 acquires contract information regarding the user of the mobile terminal 1 by communicating with the program guide management server 11.

In step S23, the control unit 131 determines whether or not an instruction for displaying a program guide has been given, and is on standby until determining that an instruction for displaying a program guide has been given. In a case where the item "Program guide" is selected from a menu screen such as that depicted in FIG. 3 and an instruction for displaying a program guide is determined to have been given in step S23, the process proceeds to step S24.

In step S24, the display control unit 151 specifies a viewable channel on the basis of the contract information acquired by the program guide data acquisition unit 135, and displays a program guide in which a Playable Indicator is placed in the column of the viewable channel. In a case where the screen reader function is off, the program guide in FIG. 11 is displayed. In a case where the screen reader function is on, the program guide in FIG. 12 is displayed.

As described so far, a Playable Indicator is displayed in the column of a viewable channel, whereby a program guide that is easy to understand which channel is viewable can be presented to a user.

The case of displaying a program guide has been explained. However, also in a case of displaying another screen, a viewable channel is specified on the basis of contract information acquired by the program guide management server 11 or the like, and a Playable Indicator is displayed.

In the aforementioned case, a screen including a Playable Indicator is displayed on the mobile terminal 1. However, a Playable Indicator may be displayed on a screen displayed on the TV 2.

Other Examples

Each of the program guide management server 11, the mobile terminal program distribution server 12, and the program distribution server 13 may physically include one device, or may include multiple devices connected to one another via a network.

Also, display of a screen of a program guide or the like including a Playable Indicator is conducted in the mobile terminal 1 on the basis of contract information or the like. However, a screen including a Playable Indicator may be generated on the server side (e.g., the program guide management server 11) on the basis of the contract information. In this case, information regarding the screen including a Playable Indicator generated on the server side is transmitted to the mobile terminal 1 or the TV 2 so that display of the screen is conducted.

Thus, screens each including a program guide described above may be generated on the server side such as the program guide management server 11. In the mobile terminal 1, screens are displayed on the basis of information transmitted from the server.

The aforementioned switching of display of a program guide and display of a screen including a Playable Indicator are appliable to display control which is performed by a device without a display unit such as a set top box.

<Configuration Example of Computer>

The aforementioned series of processes can be executed by hardware, or may be executed by software. In a case where the series of processes is executed by software, a program constituting the software is installed, from a program recording medium, into a computer incorporated in dedicated-hardware or into a general-purpose personal computer.

FIG. 21 is a block diagram depicting a hardware configuration example of a computer that executes the aforementioned series of processes in accordance with a program.

A CPU (Central Processing Unit) 1001, a ROM (Read Only Memory) 1002, and a RAM (Random Access Memory) 1003 are mutually connected via a bus 1004.

Further, an input/output interface 1005 is connected to the bus 1004. An input unit 1006 including a keyboard, a mouse, or the like and an output unit 1007 including a display, a loudspeaker, or the like are connected to the input/output interface 1005. In addition, a storage unit 1008 including a hard disk, a non-volatile memory, or the like, a communication unit 1009 including a network interface or the like, and a drive 1010 for driving a removable medium 1011 are connected to the input/output interface 1005.

In the computer having the above configuration, the CPU 1001 loads a program stored in the storage unit 1008 into the RAM 1003 via the input/output interface 1005 and the bus 1004, for example, and executes the program so that the aforementioned series of processes is executed.

The program which is executed by the CPU 1001 is, for example, recorded in the removable medium 1011 or provided via a wired or wireless transmission medium such as a local area network, the internet, or digital broadcasting, and is installed into the storage unit 1008.

It is to be noted that the program which is executed by the computer may be configured to execute processes in a time-series order described in the present description, or may be configured to execute processes in parallel or at a necessary timing when a call is made.

It is to be noted that, in the present description, a system refers to a set of a plurality of constituent elements (devices, modules (components), etc.), and whether or not all the constituent elements are included in the same casing does not matter. Therefore, a set of a plurality of devices housed in separate casings and connected to one another via a network is a system, and also, one device formed by housing a plurality of modules in one casing is a system.

It is to be noted that the effects described in the present description are just examples, and thus, are not limited. In addition, another effect may be provided.

Embodiments according to the present technology are not limited those described above. Various modifications can be made within the gist of the present technology.

For example, the present technology can be configured by cloud computing in which one function is shared and cooperatively processed by a plurality of devices over a network.

In addition, the steps explained in the aforementioned flowcharts may be executed by one device, or may be executed cooperatively by a plurality of devices.

Moreover, in a case where a plurality of processes is included in one step, the plurality of processes included in the one step may be executed by one device, or may be executed cooperatively by a plurality of devices.

<Configuration Combination Examples>

The present technology can also have the following configurations.

(1)

An information processing terminal including:

a display control unit that, in a case where an assist function for voice reading of a description displayed on a screen is on, displays a screen related to a predetermined description such that the displayed screen has a structure different from that in a case where the assist function is off.

(2)

The information processing terminal according to (1), further including:

an acquisition unit that acquires program guide data, in which the display control unit displays a screen of the program guide.

(3)

The information processing terminal according to (2), in which in a case where the assist function is on, the display control unit displays a screen of the program guide which includes a plurality of screens in different layers, and, in a case where the assist function is off, the display control unit displays a screen of the program guide which includes a one-layer screen.

(4)

The information processing terminal according to (3), in which in a case where the assist function is on, the display control unit displays a screen of the program guide in a list format including a screen of a channel list and a screen of a list of a program which is provided through a predetermined channel selected from the channel list.

(5)

The information processing terminal according to (3) or (4), in which in a case where the assist function is off, the display control unit displays a screen of the program guide in a grid format in which one predetermined direction is defined as a channel direction, a direction orthogonal to the one predetermined direction is defined as a time direction, and programs are arranged at positions corresponding to time periods during which the respective programs are provided.

(6)

The information processing terminal according to any one of (2) to (5), further including:

a control unit that sets on or off of the assist function, in which the assist function is executed by a program that is different from a program by which a function of displaying the program guide is executed.

(7)

An information processing method including:

causing an information processing terminal to display, in a case where an assist function for voice reading of a description displayed on a screen is on, a screen related to a predetermined description such that the displayed screen has a structure different from that in a case where the assist function is off.

(8)

A program for causing a computer to execute:

a process of, in a case where an assist function for voice reading of a description displayed on a screen is on, displaying a screen related to a predetermined description such that the displayed screen has a structure different from that in a case where the assist function is off.

(9)

An information processing terminal including:

an acquisition unit that acquires information indicating a viewable channel among a plurality of channels by which programs are provided, and a display control unit that displays, on a screen on which information regarding the programs is displayed, an indicator indicating that a channel is viewable.

(10)

The information processing terminal according to (9), in which the display control unit displays the indicator in a region of a viewable channel among regions of respective channels formed on a screen of a program guide.

(11)

The information processing terminal according to (9), in which the display control unit displays the indicator on a screen of a program guide in a grid format in which one predetermined direction is defined as a channel direction, a direction orthogonal to the one predetermined direction is defined as a time direction, and programs are arranged at positions corresponding to time periods during which the respective programs are provided.

(12)

The information processing terminal according to (9), in which the display control unit displays the indicator in a region of a viewable channel among regions of respective channels formed on a screen of a channel list.

REFERENCE SIGNS LIST

1 Mobile terminal, 2 TV, 11 Program guide management server, 12 Mobile terminal program distribution server, 13 Program distribution server, 131 Control unit, 132 Program data acquisition unit, 133 Reproduction unit, 134 Output control unit, 135 Program guide data acquisition unit, 141 Video decoder, 142 Audio decoder, 151 Display control unit, 152 Sound output control unit

The invention claimed is:

1. An information processing terminal comprising:

a display device that, in a case where an assist function for voice reading of a discription displayed on the display device of the information processing terminal is one, displays a screen related to a predetermined description such that the displayed screen has a first structure instead of a screen displayed on the display device in a case where the assist function for voice reading is switched off, the first structure is comprised of cells and the first structure is different from the screen displayed in the case where the assist function for voice reading is off in terms of positional layout of the cells, wherein the displayed screen having the first structure different from that in a case where the assist function for voice reading is off is related to progrem content receivable by the information processing terminal over a network and is presented on the display device of the information processing terminal, wherein in the case where the assist function for voice reading is on, the first structure of the displayed screen is in a list format in which items on the displayed screen are listed in one column which includes a list of channels or programs, wherein in the case where the assist function for voice reading is off, the displayed screen has a second structure that is in a grid format in which items on the displayed screen are in a grid in a plurality of columns.

2. The information processing terminal according to claim 1, further comprising:

circuitry configured to acquire program guide data, wherein the display device displays a screen of the program guide.

3. The information processing terminal according to claim 2, wherein in a case where the assist function for voice reading is on, the display device displays a screen of the program guide which includes a plurality of screens in different layers, and in a case where the assist function is off, the display device displays a screen of the program guide which includes a one-layer screen.

4. The information processing terminal according to claim 3, wherein in a case where the assist function is on, the display device displays a screen of the program guide in a list format including a screen of a channel list and a screen of a list of a program which is provided through a predetermined channel selected from the channel list.

5. The information processing terminal according to claim 3, wherein in a case where the assist function is off, the display device displays a screen of the program guide in a grid format in which one predetermined direction is defined as a channel direction, a direction orthogonal to the one predetermined direction is defined as a time direction, and programs are arranged at positions corresponding to time periods during which the respective programs are provided.

6. The information processing terminal according to claim 2, further comprising:

the circuitry is configured to set the assist function for voice reading on or off, wherein the assist function for voice reading is executed by a program that is different from a program by which a function of displaying the program guide is executed.

7. The information processing terminal according to claim 1, wherein in the case where the list format is displayed, the items on the displayed screen are listed in one column without a time axis.

8. The information processing terminal according to claim 1, further comprising circuitry configured such that when the assist function for voice reading is changed from on to off, the second structure is displayed, and
when the assist function for voice reading is changed from off to on, the first structure is displayed.

9. An information processing method comprising:
causing an information processing terminal to display, in a case where an assist function for voice reading of a description displayed on a display of the information processing terminal is on, a screen related to a predetermined description such that the displayed screen has a first structure instead of a screen displayed on the display in a case where the assist function for voice reading is switched off, the first structure is comprised of cells and the first structure is different from the screen displayed in the case where the assist function for voice reading is off in terms of positional layout of the cells,
wherein the displayed screen having the first structure different from that in a case where the assist function for voice reading is off is related to program content receivable by the information processing terminal over a network and is presented on the display of the information processing terminal,
wherein in the case where the assist function for voice reading is on, the first structure of the displayed screen is in a list format in which items on the displayed screen are listed in one column which includes a list of channels or programs,
wherein in the case where the assist function for voice reading is off, the displayed screen has a second structure that is in a grid format in which items on the displayed screen are in a grid in a plurality of columns.

10. The information processing method of claim 9, wherein in the case where the list format is displayed, the items on the displayed screen are listed in one column without a time axis.

11. The information processing method of claim 9, wherein when the assist function for voice reading is changed from on to off, the second structure is displayed, and
when the assist function for voice reading is changed from off to on, the first structure is displayed.

12. An information processing terminal comprising a program configured to execute:
a process of, in a case where an assist function for voice reading of a description displayed on display of the information processing terminal is on, displaying a screen related to a predetermined description such that the displayed screen has a first structure instead of a screen displayed on the display in a case where the assist function for voice reading is off,
wherein the displayed screen having the first structure different from that in a case where the assist function for voice reading is switched off is related to program content receivable by the information processing terminal over a network and is presented on the display of the information processing terminal, the first structure is comprised of cells and the first structure is different from the screen displayed in the case where the assist function for voice reading is off in terms of positional layout of the cells, wherein in the case where the assist function for voice reading is on, the first structure of the displayed screen is in a list format in which items on the displayed screen are listed in one column which includes a list of channels or programs,
wherein in the case where the assist function for voice reading is off, the displayed screen has a second structure that is in a grid format in which items on the displayed screen are in a grid in a plurality of columns.

13. The information processing terminal of claim 12, wherein in the case where the list format is displayed, the items on the displayed screen are listed in one column without a time axis.

14. The information processing terminal of claim 12, wherein when the assist function for voice reading is changed from on to off, the second structure is displayed, and when the assist function for voice reading is changed from off to on, the first structure is displayed.

* * * * *

UNITED STATES PATENT AND TRADEMARK OFFICE
CERTIFICATE OF CORRECTION

| | | |
|---|---|---|
| PATENT NO. | : 12,088,889 B2 | Page 1 of 1 |
| APPLICATION NO. | : 16/753158 | |
| DATED | : September 10, 2024 | |
| INVENTOR(S) | : Manabu Yasumi | |

It is certified that error appears in the above-identified patent and that said Letters Patent is hereby corrected as shown below:

In the Claims

In Claim 1:
Column 18, Lines 6-7:
"a discription displayed on the display device of the information processing terminal is one"
Should be:
-- a description displayed on the display device of the information processing terminal is on --

Signed and Sealed this
Thirtieth Day of September, 2025

John A. Squires
*Director of the United States Patent and Trademark Office*